(12) United States Patent
Zhang et al.

(10) Patent No.: US 11,645,542 B2
(45) Date of Patent: May 9, 2023

(54) UTILIZING A GENETIC ALGORITHM IN APPLYING OBJECTIVE FUNCTIONS TO DETERMINE DISTRIBUTION TIMES FOR ELECTRONIC COMMUNICATIONS

(71) Applicant: Adobe Inc., San Jose, CA (US)

(72) Inventors: Lei Zhang, Santa Clara, CA (US); Jun He, Fremont, CA (US); Zhenyu Yan, Cupertino, CA (US); Wuyang Dai, San Jose, CA (US); Abhishek Pani, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 1058 days.

(21) Appl. No.: 16/384,558

(22) Filed: Apr. 15, 2019

(65) Prior Publication Data
US 2020/0327419 A1 Oct. 15, 2020

(51) Int. Cl.
G06F 17/18 (2006.01)
G06N 3/086 (2023.01)
G06N 3/10 (2006.01)
G06Q 30/02 (2012.01)
G06F 8/38 (2018.01)

(52) U.S. Cl.
CPC ............ G06N 3/086 (2013.01); G06F 17/18 (2013.01); G06N 3/10 (2013.01)

(58) Field of Classification Search
CPC .......... G06N 3/086; G06N 3/10; G06N 20/00; G06N 3/0454; G06N 3/126; G06F 17/18
See application file for complete search history.

(56) References Cited

U.S. PATENT DOCUMENTS

| 9,589,278 | B1 | 3/2017 | Wang |
| 9,691,035 | B1 | 6/2017 | Sandler |
| 9,754,266 | B2 | 9/2017 | Zhang |
| 10,229,424 | B1 * | 3/2019 | Liu .................. G06Q 30/02 |
| 10,395,271 | B2 * | 8/2019 | Kassko ............. G06Q 30/0243 |
| 11,250,942 | B1 * | 2/2022 | Ahmad .................. G16H 20/60 |

(Continued)

OTHER PUBLICATIONS

Leskovec, Jure; "Recommender Systems: Latent Factor Models," Stanford CS246: Mining Massive Datasets; Jan. 31, 2019; p. 1-58; https://web.stanford.edu/class/cs246/slides/08-recsys2.pdf.

(Continued)

*Primary Examiner* — Brandon S Cole
(74) *Attorney, Agent, or Firm* — Keller Preece PLLC

(57) ABSTRACT

The present disclosure relates to systems, methods, and non-transitory computer readable media for generating a target distribution schedule for providing electronic communications based on predicted behavior rates by utilizing a genetic algorithm and one or more objective functions. For example, the disclosed systems can generate predicted behavior rates by training and utilizing one or more behavior prediction models. Based on the predicted behavior rates, the disclosed systems can further utilize a genetic algorithm to apply objective functions to generate one or more candidate distribution schedules. In accordance with the genetic algorithm, the disclosed systems can select a target distribution schedule for a particular user/client device. The disclosed systems can thus provide one or more electronic communications to individual users based on respective target distribution schedules.

20 Claims, 12 Drawing Sheets

(56) References Cited

U.S. PATENT DOCUMENTS

| | | | |
|---|---|---|---|
| 2008/0306804 A1* | 12/2008 | Opdycke | G06Q 30/0244 |
| | | | 705/7.29 |
| 2012/0253854 A1* | 10/2012 | Leonardo | G06Q 20/105 |
| | | | 705/309 |
| 2013/0132854 A1* | 5/2013 | Raleigh | H04M 15/77 |
| | | | 715/738 |
| 2015/0019325 A1 | 1/2015 | Li et al. | |
| 2015/0193548 A1 | 7/2015 | Nice et al. | |
| 2015/0278908 A1 | 10/2015 | Nice et al. | |
| 2019/0295123 A1 | 9/2019 | Magnuson-Skeels et al. | |
| 2020/0034884 A1 | 1/2020 | Ramanuja et al. | |

OTHER PUBLICATIONS

Steffen Rendle, "Factorization Machines", Dept. of Reasoning for Intelligence; The Institute of Scientific and Industrial Research; Osaka University, Japan; 2010.

Chih-Jen Lin; "Matrix Factorization and Factorization Machines for Recommender Systems"; Department of Computer Science National Taiwan University; Talk at SDM workshop on Machine Learning Methods on Recommender Systems, May 2, 2015; https://www.csie.ntu.edu.tw/~cjlin/talks/sdm2015.pdf.

"Factorization Machines in Python"; Downloaded on Sep. 9, 2019; https://github.com/coreylynch/pyFM.

U.S. Appl. No. 16/564,768, May 12, 2020, Preinterview 1st Office Action.

U.S. Appl. No. 16/564,768, Jul. 1, 2020, 1st Action Office Action.

U.S. Appl. No. 16/564,768, Nov. 17, 2020, Office Action.

U.S. Appl. No. 16/564,768, Feb. 9, 2021, Notice of Allowance.

* cited by examiner

| | Conventional System | Genetic Communication Distribution System | Inc.% |
|---|---|---|---|
| Total Sent | 326225 | 378656 | 16% |
| Total Open | 68898 | 103249 | 50% |
| Total Click | 2379 | 4283 | 80% |
| Total Fatigue | 899 | 729 | -19% |
| Avg Open Rate per Delivery | 0.21 | 0.272 | 30% |
| Avg Click Rate per Delivery | 0.0073 | 0.0113 | 55% |
| Avg Fatigue Rate Per Delivery | 0.0028 | 0.0019 | -30% |
| At Least One Open Probability | 0.296 | 0.67 | 126% |
| At Least One Click Probability | 0.019 | 0.04 | 111% |
| Fatigue Probability | 0.009 | 0.007 | -22% |
| Total Recipients | 99362 | | |

Fig. 9

UTILIZING A GENETIC ALGORITHM IN APPLYING OBJECTIVE FUNCTIONS TO DETERMINE DISTRIBUTION TIMES FOR ELECTRONIC COMMUNICATIONS

BACKGROUND

Advancements in software and hardware platforms have led to a variety of improvements in systems that provide targeted digital communications to client devices. For example, digital communication distribution systems are now able to provide digital communications to many different client devices across computer networks based on previous digital interactions with digital content. Indeed, some systems can select distribution times to provide digital communications to client devices based on pre-determined heuristics, fixed day/time batch delivery, and/or empirical rule-based methods.

Despite these advances however, conventional digital communication distribution systems continue to suffer from a number of disadvantages, particularly in their accuracy, efficiency, and flexibility. Indeed, conventional systems often inaccurately determine distribution times for providing digital communications to users to effectively elicit client device responses and avoid user fatigue. As mentioned, many of these conventional systems utilize fixed day/time delivery methods where delivery times are selected uniformly for an entire population of recipients. As a result, these systems fail to accurately determine effective distribution timing for providing digital communications to individual recipient devices. Indeed, distributing digital communications to all recipient devices at the same day/time fails to accommodate individual user behavior and/or fatigue tolerance, and these systems thus reduce the probability that a recipient will respond to the digital communication.

Although some empirical systems collect and analyze data (such as AB testing systems), these systems base timing determinations on broad-spectrum information that is population-based and not individualized to particular client devices and/or recipients. Additionally, many of these conventional systems require human experts to run and observe tests on recipient behavior over a period of time. Introducing excessive numbers of rules (which are sometimes ambiguous), along with the possibility of human error, makes these systems exhibit significantly lower performance in accurately determining effective times for distributing digital communications.

Additionally, many conventional digital communication distribution systems are inefficient. For example, many conventional digital communication distribution systems rely on time-consuming, expensive, and computationally-intensive testing (such as AB testing) in providing digital communications to client devices. Moreover, some conventional systems rely on expert rule-based systems, that require time-intensive and inefficient expert analysis to identify, test, and select heuristics for distributing digital content. In addition, due at least in part to the inaccuracy of conventional systems, these systems further inefficiently utilize computer resources in generating and providing digital communications to users at ineffective (or less effective) times. Thus, these conventional digital communication distribution systems waste computation time and power in providing digital communications that yield relatively few results.

Moreover, many conventional digital communication distribution systems are also inflexible. For example, many digital communication distribution systems are limited to rigid, population-based timing determinations and cannot therefore adapt to individualized recipient information relating to historical behavior and/or fatigue. For example, conventional systems often distribute the same electronic communications at the same time and at the same frequency to recipients, irrespective of how and when particular recipients have responded in the past. In addition, many conventional systems are limited to short time horizons and confined to single tasks or objectives—these systems cannot effectively adapt to different objectives based on varying circumstances of a digital content campaign.

Thus, there are several disadvantages with regard to conventional digital communication distribution systems.

SUMMARY

One or more embodiments described herein provide benefits and solve one or more of the foregoing or other problems in the art with systems, methods, and non-transitory computer readable media that utilize a genetic algorithm in applying objective functions to determine send times for providing electronic messages to client devices, while also accounting for individualized fatigue patterns. Indeed, in one or more embodiments the disclosed systems promote improve engagement across recipient client devices by determining distribution times over a time horizon that more effectively produce a response along each individual recipient's decision journey. More specifically, the disclosed systems can utilize a genetic algorithm in conjunction with flexible, personalized objective functions to automatically generate personalized distribution schedules for individual recipients based on historical behavior in relation to previously distributed electronic communications.

For example, in some embodiments the disclosed systems utilize behavior models to generate user-specific predictions of open rates, clicks rates, and fatigue scores. Based on these predictions, the disclosed systems can implement a genetic algorithm to generate a distribution schedule for providing electronic communications to a client device of the user over a target time horizon. As part of the genetic algorithm, for instance, the disclosed systems can iteratively improve (otherwise intractable) objective functions in determining effective distribution times as part of a target distribution schedule. In this manner, the disclosed systems can efficiently identify accurate distribution schedules that are flexibly tailored to distribute digital content to individual recipients and corresponding client devices.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 9 illustrates an example table illustrating improvements of the genetic communication distribution system over conventional systems in accordance with one or more embodiments;

DETAILED DESCRIPTION

Figure 1:
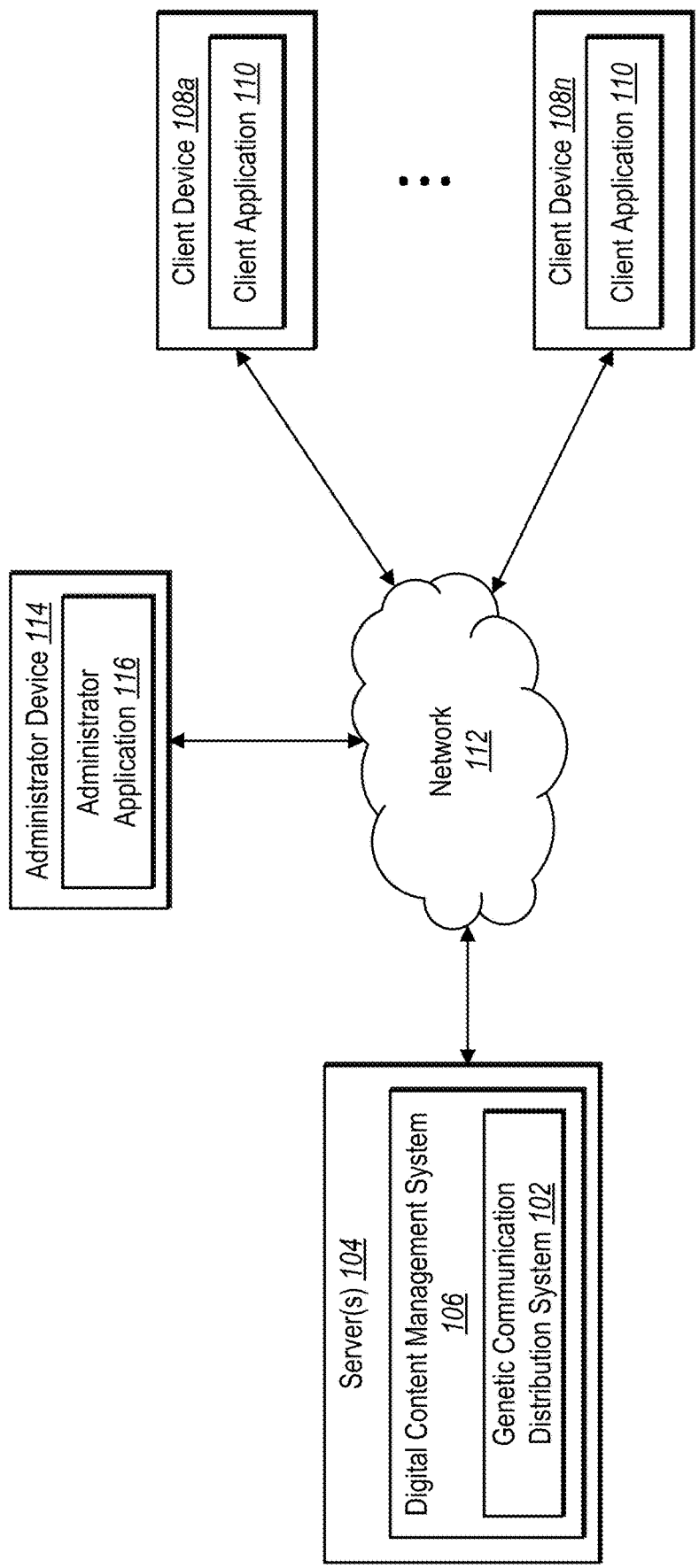
FIG. 1 illustrates an example environment for implementing a genetic communication distribution system in accordance with one or more embodiments.

One or more embodiments described herein provide benefits and solve one or more of the foregoing or other problems in the art with a genetic communication distribution system that determines a distribution schedule for providing electronic communications to client devices utilizing a genetic algorithm in conjunction with one or more objective functions. In particular, the genetic communication distribution system can utilize one or more prediction models that leverage machine learning methods to predict open rates, click rates, and/or fatigue scores based on historical behavior data. In addition, the genetic communication distribution system can utilize a genetic algorithm to apply personalized objective functions to these predictions. In repeatedly applying a genetic algorithm for a number of iterations (or until one or more stopping criteria satisfied), the genetic communication distribution system can dynamically generate a set of candidate distribution schedules specific to an individual user. By intelligently utilizing predicted open rates, predicted click rates, and predicted fatigue scores in applying the genetic algorithm, the genetic communication distribution system can efficiently select a target distribution schedule for an individual user from the set of candidate distribution schedules.

As just mentioned, the genetic communication distribution system can generate a set of candidate distribution schedules. In some embodiments, the genetic communication distribution system generates candidate distribution schedules based on predictions of individual user behavior. For example, the genetic communication distribution system can utilize machine learning models such as an open behavior model, a click behavior model, and/or a fatigue behavior model to generate user-specific predictions for an open rate, a click rate, and/or a fatigue rate, respectively. In the same or other embodiments, the genetic communication distribution system further trains the open behavior model, the click behavior model, and/or the fatigue behavior model to generate accurate predictions based on training data (e.g., historical user behavior in relation to previously distributed electronic communications). In this manner, the genetic communication distribution system can generate behavioral predictions for a plurality of users associated with client devices on an individualized basis.

In addition, the genetic communication distribution system can utilize the generated predictions to determine a target distribution schedule for providing electronic communications to an individual user. To determine the target distribution schedule, the genetic communication distribution system can utilize a genetic algorithm to generate a set of candidate distribution schedules and select a target distribution schedule from the set of candidate distribution schedules. Specifically, the genetic communication distribution system can utilize a genetic algorithm that initiates a set of candidate distribution schedules, determines a fitness of the candidate distribution schedules, selects a subset of candidate distribution schedules, and then generates crossover and/or mutation candidate distribution schedules to identify improved candidates. By iteratively performing this process, the genetic communication distribution system can identify distribution schedules that improve a personalized object for individual client device users.

In applying this genetic algorithm, the genetic communication distribution system can utilize a variety of personalized objective functions. For example, as described in greater detail below, the genetic communication distribution system can utilize one or more of a rate maximization objective function, an open rate decay objective function, or a threshold interaction probability function, to generate a set of candidate distribution schedules. The genetic communication distribution system can flexibly determine distribution schedules based on any of these (or other) objective functions to satisfy the goals of a particular digital content campaign. Indeed, the genetic distribution system can apply a first objective function to a first digital content campaign and a second objective function to a second digital content campaign, giving administrator devices flexibility to improve performance in relation to individualized campaign objectives.

In complex applications, such as distribution schedule prediction over a variable time horizon, solving (e.g., optimizing) such objective functions can be intractable. By utilizing a genetic algorithm, the genetic communication distribution system can efficiently identify improved (e.g., optimized) distribution schedules. Indeed, in applying a genetic algorithm to personalized objective functions, the genetic communication distribution system can explore and learn the solution space for any particular objective function and ultimately identify an optimal (or near optimal) distribution schedule.

For example, as mentioned above, the genetic communication distribution system can utilize a genetic algorithm that utilizes an initialization process to generate an initial set of candidate distribution schedules. To elaborate, the genetic communication distribution system can be initialized by generating a set of initial candidate distribution functions that satisfy various constraints with regard to the objective functions discussed above. For example, the genetic communication distribution system can utilize one or more of a rate maximization objective function, an open rate decay objective function, or a threshold interaction probability function, to generate a set of candidate distribution schedules. In some embodiments, the genetic communication distribution system can be initialized by a set of candidate distribution schedules that are generated from greedy algorithm.

Additionally, in some embodiments the genetic communication distribution system implements a fitness assignment and a selection process as part of the genetic algorithm. In particular, the genetic communication distribution system can apply a fitness function that generates fitness scores (e.g., fitness scores that reflect objectives of the digital content campaign). Based on the fitness scores, the genetic communication distribution system can select candidate distribution schedules.

Further, in some embodiments the genetic communication distribution system generates crossover or mutation candidate distribution schedules to explore the objective function space and identify improved distribution schedule solutions. For example, to generate a crossover distribution schedule, the genetic communication distribution system can select and combine two or more distribution schedules. Similarly, the genetic communication distribution system can generate a mutation distribution schedule by selecting a distribution schedule and applying a complement operation to mutate individual distribution times. Further, the genetic communication distribution system can determine whether crossover distribution schedules and mutation distribution schedules are feasible and add (or drop) the crossover/mutation distribution schedules to the set of candidate distribution schedules based on the feasibility determination.

To efficiently determine effective distribution times for providing electronic communications to client devices, the genetic communication distribution system can select a target distribution schedule from the set of candidate distribution schedules. For example, as part of the genetic algorithm, the genetic communication distribution system can iteratively perform the fitness assignment and selection process and identify crossover and/or mutation distribution schedules until one or more stop criteria are satisfied. The genetic communication distribution system can then select a target distribution schedule for a given user (e.g., a target distribution schedule with the highest results from the objective function). Moreover, the genetic communication distribution system can distribute electronic communications based on the target distribution schedule.

The genetic communication distribution system provides several advantages over conventional digital communication distribution systems. For example, the genetic communication distribution system improves accuracy relative to these conventional systems. More specifically, the genetic communication distribution system utilizes individualized user-specific information to automatically generate personalized distribution schedules for individual recipients over variable (e.g., weeks or months long) time horizons. Indeed, the genetic communication distribution system automatically determines a delivery day and time for a recipient based on the recipient's historical behavior patterns. To further improve accuracy, the genetic communication distribution system automatically determines a distribution frequency and/or a quantity of electronic communications to be distributed based on fatigue patterns associated with the recipient. Further, the genetic communication distribution system generates distribution schedules for individual recipients automatically, without the need of human assistance, thereby further improving accuracy over rule-based systems that require human interaction to oversee individual tests.

In addition, the genetic communication distribution system improves efficiency over conventional systems. For example, in contrast to conventional systems that rely on time consuming, expensive test-based models (e.g., AB testing) or time-intensive expert rule-based models to determine send times for providing electronic communications, the genetic communication distribution system utilizes a genetic algorithm analysis that quickly, efficiently, and automatically identifies distribution schedules for individual users. Additionally, due at least in part to the improved accuracy of the genetic communication distribution system, the genetic communication distribution system further improves efficiency over conventional systems by providing electronic communications at more effective times for eliciting user responses. Thus, compared to conventional systems, the genetic communication distribution system wastes fewer computer resources in generating and distributing electronic communications that do not produce responses.

As a further advantage, the genetic communication distribution system improves flexibility over conventional digital communication distribution systems. Particularly, the genetic communication distribution system can flexibly adapt on an individual-by-individual basis. Indeed, the genetic communication distribution system can uniquely tailor distribution schedules for electronic communications to individual users/client devices. The genetic communication distribution system can also flexibly modify objectives for a digital content campaign. For example, as discussed in greater detail below, the genetic communication distribution system can generate distribution schedules to accomplish different customizable objectives for different digital content campaigns.

As illustrated by the foregoing discussion, the present disclosure utilizes a variety of terms to describe features and benefits of the genetic communication distribution system. Additional detail is hereafter provided regarding the meaning of these terms as used in this disclosure. In particular, the term "electronic communication" (or simply "communication") refers to electronic data provided to client device(s) of a user or a group of users. An electronic communication can include an electronic message of a variety of formats using a number of protocols such as email messages, text (e.g., SMS, MMS, RCS, or iMessage) messages, phone calls, mobile short messages, mobile application push notifications, web browser push notifications, or targeted digital content campaign banners. In addition, an electronic communication can include digital content in the form of digital audio, digital video, digital images, and/or digital text. Further, an electronic communication can include information pertaining to a product or service related to a digital content campaign. Indeed, electronic communications can be distributed to users as part of a digital content campaign.

As mentioned, the genetic communication distribution system can generate predictions of various response rates for individual users, such as open rates, click rates, and fatigue rates (or scores). As used herein, the terms "open rate," "click rate," and "fatigue rate" (or "open score", "click score," and fatigue score") refer to a measure of user actions (or inactions) associated with, or instigated by, electronic communications. In particular, "open rate," "click rate," and "fatigue rate" can include a rate (e.g., a number per unit of electronic communications or time) or some other score that reflects user interactions resulting from distributing electronic communications. For example, an open rate can include a number of opens (e.g., a number of opened, read, or viewed electronic communications) over a particular number of electronic communications and/or over a particular time period or time horizon. Similarly, a click rate can include a number of clicks (e.g., clicks or other selections within an electronic communication) over a particular number of electronic communications and/or over a time period or time horizon.

Likewise, a fatigue rate (or fatigue score) can include an indication of fatigue behavior (e.g., subscription cancellations, unsubscribes, user interaction time lapses, or deletions of electronic communications). For instance, a fatigue rate (or score) can include a number of fatigue events by a user over a particular number of electronic communications and/or over a particular time period or time horizon.

To generate open rates, click rates, and fatigue rates, the genetic communication distribution system can utilize various behavior models such as an open behavior model, a click behavior model, and a fatigue behavior model. As used herein, "open behavior model" refers to a machine learning model trained to predict open rates based on training data (e.g., as historical user behavior data). The term "click behavior model" similarly refers to a machine learning model trained to predict click rates based on training data. In addition, the term "fatigue behavior model" refers to a machine learning model trained to generate predictions of fatigue rates based on training data. In some embodiments, one or more of the open behavior model, the click behavior model, and/or the fatigue behavior model can include a neural network-based model such as a convolutional neural network or a deep neural network that each include one or more weights, layers, and neurons for generating predictions.

In addition, the term "train" refers to utilizing information to tune or teach a model (e.g., by adjusting one or more weights of a machine learning model) such as the open behavior model, the click behavior model, and/or the fatigue behavior model. The term "training" (used as an adjective or descriptor, such as "training data," "training response," or "training electronic communication") refers to information or data utilized to tune or teach the model. In some embodiments, the genetic communication distribution system trains one or more models to generate accurate predictions based on training data.

As mentioned, the genetic communication distribution system can utilize a genetic algorithm to generate a target distribution schedule over a target time horizon. The term "genetic algorithm" refers to an evolutionary computer algorithm for iteratively generating and analyzing candidate solutions. In particular, a genetic algorithm can include a computer algorithm that identifies generating solutions to optimization and/or search problems by generating, analyzing, and morphing candidate solutions to identify an optimal (or near-optimal) result relative to a particular objective. As described in greater detail below, a genetic algorithm can include a plurality of acts, processes, or methods such as initialization, fitness assignment, selection, crossover, and/or mutation. In addition, a genetic algorithm can be repeatable for a plurality of iterations or cycles to improve the accuracy of a final output based on additional analysis and modification of previous iterations.

As used herein, the term "target" (used as an adjective or descriptor) refers to a metric desired or sought by a user (e.g., an administrator or manager of a digital content campaign) or system. For example, the genetic communication distribution system can receive input from an administrator device to indicate target metrics such as a target horizon. In addition, the genetic communication distribution system can generate a target distribution schedule from a set of candidate distribution schedules.

As used herein, the term "distribution schedule" refers to a set of one or more individual distribution times for distributing electronic communications to users. A distribution schedule can include, for each individual distribution time, an indication of whether or not to distribute electronic communications. In some embodiments, a distribution schedule refers to a vector of binary variables corresponding to one or more time slots representing individual distribution times over a time horizon, where each time slot includes a binary decision to distribute (e.g., a "1") or refrain from distributing (e.g., a "0") electronic communications.

As mentioned above, in applying a genetic algorithm, the genetic communication distribution system can generate a crossover distribution schedule and/or a mutation distribution schedule. As used herein, a "crossover distribution schedule" refers to a distribution schedule generated by blending two or more existing distribution schedules. As used herein, a "mutation distribution schedule" refers to a distribution schedule generated by modifying (or mutating) an existing distribution schedule. Additional detail regarding generating crossover and/or mutation distribution schedules is provided below with reference to the figures.

Relatedly, the term "time horizon" refers to a measure or scale of time. Indeed, a time horizon can refer to a period of time spanning one day, one week, one month, six months, one year, etc. For example, a time horizon can refer to a one-month period where the genetic communication distribution system generates a distribution schedule over the time horizon to indicate whether or not to distribute electronic communications for individual distribution times (e.g., what days in the month to provide digital content). The term "distribution time" (or "send time") refers to a time to provide an electronic communication to a client device/user. For example, a distribution time can refer to an individual time slot within a distribution schedule. In one or more embodiments, the genetic communication distribution system provides electronic communications to client devices of users based on distribution times to maximize the probability of eliciting a response.

As mentioned, the genetic communication distribution system can generate a set of distribution schedules by applying one or more objective functions. As used herein, the term "objective function" refers to a function, method, or technique for evaluating an outcome or objective. For example, an objective function includes a model that reflects an outcome or objective to be improved (e.g., maximized or minimized) by modifying one or more input variables. To illustrate, an objective function can include an operation, algorithm, or function that maximizes or minimizes a particular result by modifying a distribution schedule variable. In some embodiments, the genetic communication distribution system generates distribution schedules by implementing one or more objective functions such as a "rate maximization objective function" (e.g., an objective function for improving open rate or click rate), an "open rate decay objective function" (e.g., an objective function for improving open rate or click rate while considering open rate decay), and a "threshold interaction objective function" (e.g., an objective function to improve the probability of at least one open or click). Additional detail regarding specific objective functions is provided below.

As further mentioned, the genetic communication distribution system utilizes a fitness function to evaluate distribution schedules based on distribution parameters as part of the genetic algorithm. The term "fitness function" refers to a computer algorithm that evaluates distribution schedules to determine whether to select (those that satisfy distribution parameters) or discard (those that fail to satisfy distribution parameters) the distribution schedules. In some embodiments, the genetic communication distribution system ranks distribution schedules based on the fitness function, where higher fitness rankings are assigned to those distribution schedules that better satisfy distribution parameters. In these or other embodiments, a fitness function is the objective function. Relatedly, the term "distribution parameter" refers to parameters or metrics utilized to measure or evaluate the fitness of generate distribution schedules. Distribution parameters can include, but are not limited to, a survival rate, a maximum number of survived distribution schedules, a minimum number of survived distribution schedules, and/or a selection probability distribution (e.g., a probability distribution of selected candidate distribution schedules).

Additional detail regarding the genetic communication distribution system will now be provided with reference to the figures. For example, FIG. 1 illustrates a schematic diagram of an example environment for implementing a genetic communication distribution system 102 in accordance with one or more embodiments. An overview of the genetic communication distribution system 102 is described in relation to FIG. 1. Thereafter, a more detailed description of the components and processes of the genetic communication distribution system 102 is provided in relation to the subsequent figures.

As shown in FIG. 1, the environment includes server(s) 104, client devices 108a-108n, an administrator device 114, and a network 112. Each of the components of the environment can communicate via the network 112, and the network 112 may be any suitable network over which computing devices can communicate. Example networks are discussed in more detail below in relation to FIG. 12.

As mentioned, the environment includes client devices 108a-108n. The client devices 108a-108n can be one of a variety of computing devices, including a smartphone, a tablet, a smart a television, a desktop computer, a laptop computer, a virtual reality device, an augmented reality device, or some other computing device as described in relation to FIG. 12. FIG. 1 illustrates multiple different client devices 108a-108n, where each of the client devices 108a-108n can receive user input from users in the form of user actions such as opens, clicks, subscription cancellations, deletions, etc., to electronic communications and can provide information pertaining to user input to the server(s) 104. Thus, the genetic communication distribution system 102 on the server(s) 104 can receive responses to electronic communications in the form of indications of user actions (e.g., opens, clicks, subscription cancellations, etc.) provided to the client devices 108a-108n.

As shown, the client devices 108a-108n include a client application 110. In particular, the client application 110 may be a web application, a native application installed on the client devices 108a-108n (e.g., a mobile application, a desktop application, etc.), or a cloud-based application where all or part of the functionality is performed by the server(s) 104. The client application 110 can present or display information to a user, including an electronic communication within an email interface, text messaging interface, or some other messaging or communication interface. Users can interact with the client application 110 to provide user input to, for example, open, click through, delete, cancel, or complete a purchase related to an electronic communication.

As further shown, the environment includes the administrator device 114. In particular, the administrator device 114 can communicate with the server(s) 104 and/or the client device 108a-108n via the network 112. For example, the administrator device 114 can receive input from an administrator via the administrator application 116 to set campaign parameters associated with a digital content campaign and/or for distributing electronic communications to the client devices 108a-108n. For instance, the administrator device 114 can provide, to the genetic communication distribution system 102, target metrics such as a target time horizon, a target objective, a maximum number of distributed electronic communications, a fatigue tolerance/threshold, weights, and/or exclusion dates/times. The administrator application 116 may be a web application, a native application installed on the administrator device 114 (e.g., a mobile application, a desktop application, etc.), or a cloud-based application where all or part of the functionality is performed by the server(s) 104. In addition, the administrator application 116 may include functionality to set target metrics for the digital content management system 106 and/or the genetic communication distribution system 102 to distribute electronic communications to the client devices 108a-108n. In some embodiments, the administrator application 116 can also allow for selection of other digital content campaign parameters (e.g., duration, price, target audience, etc.) or provide digital content to include in electronic communications.

As illustrated in FIG. 1, the environment includes the server(s) 104. The server(s) 104 may generate, store, process, receive, and transmit electronic data, such as electronic communications and responses to electronic communications. For example, the server(s) 104 may identify (e.g., monitor and/or receive) data from the client device 108a in the form of a click, an open, a subscription cancellation, a deletion, etc. The server(s) 104 can transmit data to the client devices 108a-108n to provide electronic communications for display via the client application 110. In addition, the server(s) 104 can receive data from the administrator device 114 in the form of a selection of campaign parameters, digital content (to include in electronic communications), target metrics such as a target time horizon and/or a target objective. The server(s) 104 can communicate with the client devices 108a-108n and the administrator device 114 to transmit and/or receive data via the network 112. In some embodiments, the server(s) 104 comprises a content server. The server(s) 104 can also comprise an application server, a communication server, a web-hosting server, a social networking server, a digital content campaign server, or a digital communication management server.

As shown in FIG. 1, the server(s) 104 can also include the genetic communication distribution system 102 (implemented as part of a digital content management system 106). The digital content management system 106 can communicate with the client devices 108a-108n to generate, modify, and transmit digital communications, such as electronic communications. In some embodiments, though not illustrated in FIG. 1, the server(s) 104 further include one or more databases such as a training database and/or an electronic communication database. In other embodiments, the database(s) are located externally from the server(s) 104 and are maintained by a third-party server connected via the network 112.

Although FIG. 1 depicts the genetic communication distribution system 102 located on the server(s) 104, in some embodiments, the genetic communication distribution system 102 may be implemented by (e.g., located entirely or in part) on one or more other components of the environment. For example, the genetic communication distribution system 102 may be implemented by the administrator device 114, the client devices 108a-108n, and/or a third-party device.

In some embodiments, though not illustrated in FIG. 1, the environment may have a different arrangement of components and/or may have a different number or set of components altogether. For example, the administrator device 114 and/or the client devices 108a-108n may communicate directly with the genetic communication distribution system 102, bypassing the network 112. Additionally, the genetic communication distribution system 102 can include one or more additional databases (e.g., a training database storing training data) housed on the server(s) 104 or elsewhere in the environment.

Figure 2:
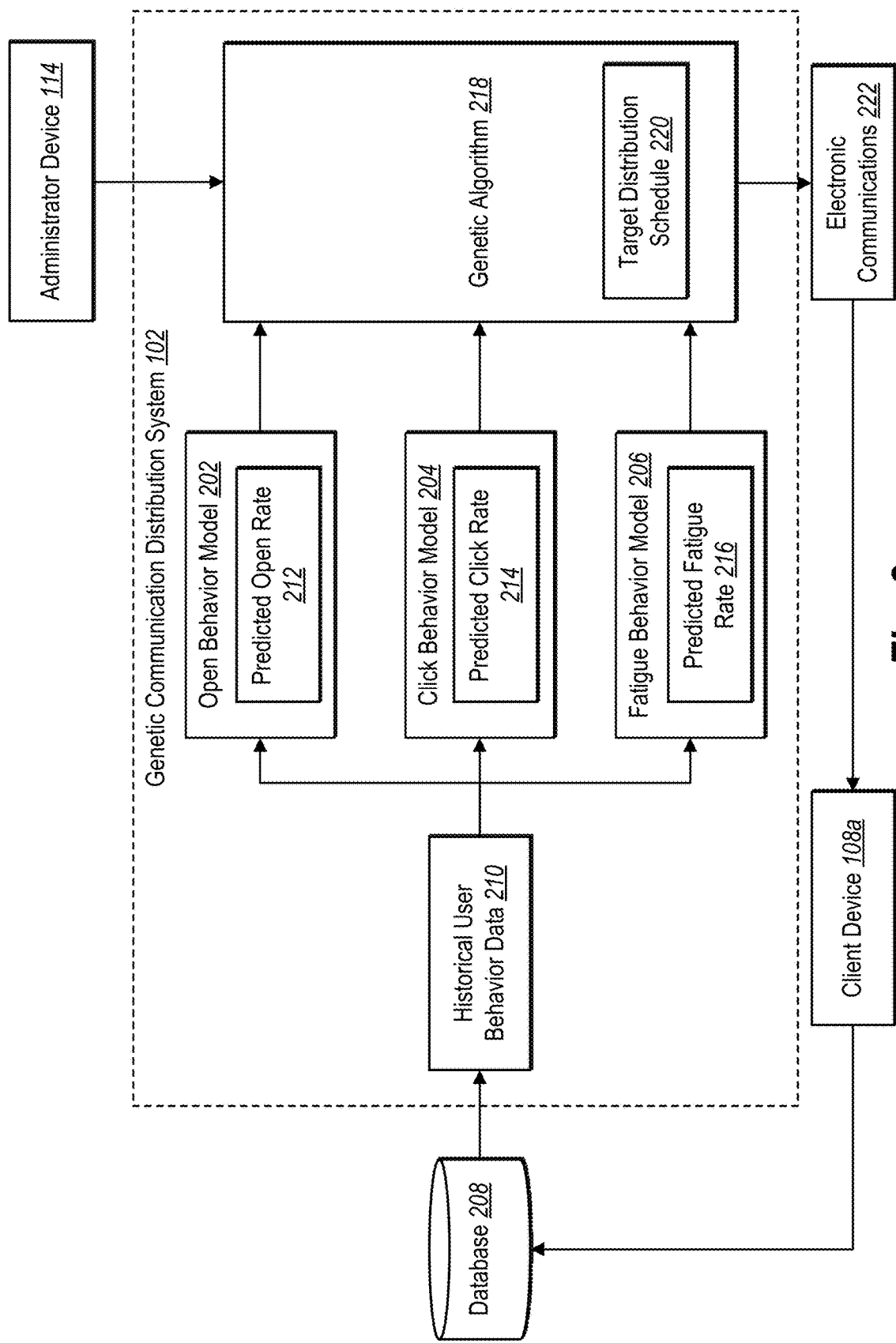
FIG. 2 illustrates an example architecture or framework of the genetic communication distribution system in accordance with one or more embodiments.

As mentioned, the genetic communication distribution system 102 can utilize a genetic algorithm to generate a target distribution schedule for distributing electronic communications to client device(s) of a user. FIG. 2 illustrates an example framework or architecture of the genetic communication distribution system 102 in accordance with one or more embodiments. As shown in FIG. 2, the genetic communication distribution system 102 includes an open behavior model 202, a click behavior model 204, a fatigue behavior model 206, and a genetic algorithm 218. The discussion of FIG. 2 provides a high-level description of the various components of the genetic communication distribution system 102, including their internal interactions as well as interactions with external components such as the database 208 and the administrator device 114. Additional detail regarding the various components, particularly the genetic algorithm 218, is provided thereafter with reference to subsequent figures.

As shown in FIG. 2, the genetic communication distribution system 102 utilizes an open behavior model 202 to generate a predicted open rate 212. In particular, the genetic communication distribution system 102 utilizes the open behavior model 202 to generate the predicted open rate 212 based on the historical user behavior data 210 obtained from the database 208. For example, the genetic communication distribution system 102 accesses the historical user behavior data 210 within the database 208. In some embodiments, the historical user behavior data 210 includes historical user actions relative to individual users. For example, the historical user behavior data 210 can include information indicating previous opens (or clicks or fatigue-based actions) by a particular user, as well as indications of when the opens (or the clicks or the fatigue-based actions) occurred, and which electronic communications triggered or instigated the respective opens (or clicks or fatigue-based actions). Moreover, the historical user behavior data 210 can include dates and/or times of previous electronic communications distributed to client device(s) of individual users.

Based on the historical user behavior data 210, the genetic communication distribution system 102 utilizes the open behavior model 202 to generate the predicted open rate 212 for the given user. For instance, the genetic communication distribution system 102 applies the open behavior model 202 that is trained to accurately generate predictions based on input data. Indeed, the genetic communication distribution system 102 initially trains the open behavior model 202 based on training data. The genetic communication distribution system 102 further re-calibrates the open behavior model 202 based on new historical user behavior data added to the database 208 in response to further distribution of electronic communications in accordance with generated distribution schedules. Additional detail regarding training the open behavior model 202 is provided below with reference to FIG. 8.

In addition to utilizing the open behavior model 202 to generate the predicted open rate 212, the genetic communication distribution system 102 further utilizes the click behavior model 204 to generate the predicted click rate 214. Indeed, the historical user behavior data 210 not only includes information relating to previous opens performed by a user, but the historical user behavior data 210 further includes information for previous clicks as well. Thus, the genetic communication distribution system 102 utilizes the historical user behavior data 210 to apply the click behavior model 204 to generate the predicted click rate 214. Similar to the open behavior model 202, the genetic communication distribution system 102 trains the click behavior model 204 and further re-calibrates the click behavior model 204 based on new historical user behavior data 210 added to the database 208 in response to monitoring user behavior in relation to electronic communications distributed using generated distribution schedules. Additional detail regarding training the click behavior model 204 is provided below with reference to FIG. 8.

Similarly, the genetic communication distribution system 102 further utilizes the fatigue behavior model 206 to generate the predicted fatigue rate 216. Particularly, the genetic communication distribution system 102 generates the predicted fatigue rate 216 based on the historical user behavior data 210, which includes information pertaining to previous fatigue-based user actions such as deletions of electronic communications and/or cancellations of subscriptions. As with the open behavior model 202 and the click behavior model 204, the genetic communication distribution system 102 trains the fatigue behavior model 206 to generate the predicted fatigue rate 216. In addition, the genetic communication distribution system 102 re-calibrates the fatigue behavior model 206 for based on new user behavior data in response to user behavior in relation to electronic communications distributed in accordance with generated distribution schedules. Additional detail regarding training the fatigue behavior model 206 is provided below with reference to FIG. 8.

As mentioned, the genetic communication distribution system 102 generates a target distribution schedule for a user. Indeed, as shown in FIG. 2, the genetic communication distribution system 102 utilizes the genetic algorithm 218 to generate the target distribution schedule 220 based on the predicted open rate 212, the predicted click rate 214, and the predicted fatigue rate 216. In addition, the genetic communication distribution system 102 distributes electronic communications 222 to a given client device 108a based on the target distribution schedule 220. The genetic communication distribution system 102 further collects or monitors user behavior by communicating with the client device 108a in response to the distributed electronic communications. Thus, the genetic communication distribution system 102 stores the new user behavior based on the distributed electronic communications 222 within the database 208 to use for re-calibrating (or re-training) the open behavior model 202, the click behavior model 204, and the fatigue behavior model 206 for subsequent determinations of target distribution schedules.

In generating the target distribution schedule 220 via the genetic algorithm, the genetic communication distribution system 102 utilizes one or more objective functions. Particularly, the genetic communication distribution system 102 utilizes one or more of a rate maximization objective function, an open rate decay objective function, or a threshold interaction probability objective function. To illustrate, in some embodiments, the genetic communication distribution system 102 applies a rate maximization objective function to generate candidate distribution schedules. For example, the genetic communication distribution system 102 applies, for a given user/client device, a first weight to the predicted open rate 212 and applies a second weight to the predicted click rate 214. Additionally, the genetic communication distribution system 102 determines, for a plurality of distribution times within a target time horizon, whether or not to provide an electronic communication at the respective distribution time. In some embodiments, the genetic communication distribution system 102 maximizes a weighted open rate and a weighted click rate over a plurality of users/client devices and/or over a plurality of distribution times across a target time horizon to generate scores for one or more candidate distribution schedules.

In the same or other embodiments, the genetic communication distribution system 102 utilizes an open rate decay objective function. In particular, the genetic communication distribution system 102 accommodates the phenomenon that recipient users may be temporarily tired of responding to electronic communications when too many come across in a short period of time. Thus, the genetic communication distribution system 102 determines a threshold delivery frequency for a given user and utilizes an objective function based on delivery frequencies associated with individual users/client devices. In these embodiments, the genetic communication distribution system 102 applies, based on the rate maximization objective function, a decay rate to the weighted open rate (and/or the weighted click rate). For example, the genetic communication distribution system 102 applies an open rate decay function to account for individual user fatigue with respect to electronic communication responses. Thus, the genetic communication distribution system 102 generates scores for candidate distribution schedules utilizing an open rate decay objective function.

In these or other embodiments, the genetic communication distribution system 102 utilizes a threshold interaction probability objective function. Particularly, the genetic communication distribution system 102 maximizes or otherwise improves a probability that a recipient user will respond to a threshold number of electronic communications over a target time horizon. For example, the genetic communication distribution system 102 maximizes a probability that a user will open and/or click at least one electronic communication. To improve the threshold interaction probability, the genetic communication distribution system 102 applies an objective function that incorporates a weighted open rate probability and a weighted click rate probability to generate scores for one or more candidate distribution schedules.

In applying the above one or more objective functions, the genetic communication distribution system 102 applies constraints to generating candidate distribution schedules. For example, the genetic communication distribution system 102 applies constraints based on one or more campaign parameters (e.g., as indicated by the administrator device 1140). In some embodiments, the genetic communication distribution system 102 applies constraints such as a total fatigue threshold across the plurality of users/client devices and/or a total number of distributed electronic communications.

As illustrated in FIG. 2, the genetic communication distribution system 102 further bases the generation of the target distribution schedule 220 on input from the administrator device 114. In particular, the genetic communication distribution system 102 receives administrator input in the form of target metrics such as a target time horizon, a target objective (e.g., improve a click rate, improve an open rate, improve a combination of clicks and opens, improve a website visit probability, improve a conversion rate, or improve a retention rate), a maximum number of distributed electronic communications, a fatigue tolerance/threshold, weights, and exclusion dates (e.g., dates to exclude from a target distribution schedule). Thus, the genetic communication distribution system 102 utilizes the genetic algorithm 218 to generate the target distribution schedule 220 based on the target metrics received from the administrator device 114 in addition to the predicted open rate 212, the predicted click rate 214, and the predicted fatigue rate 216.

Figure 3:
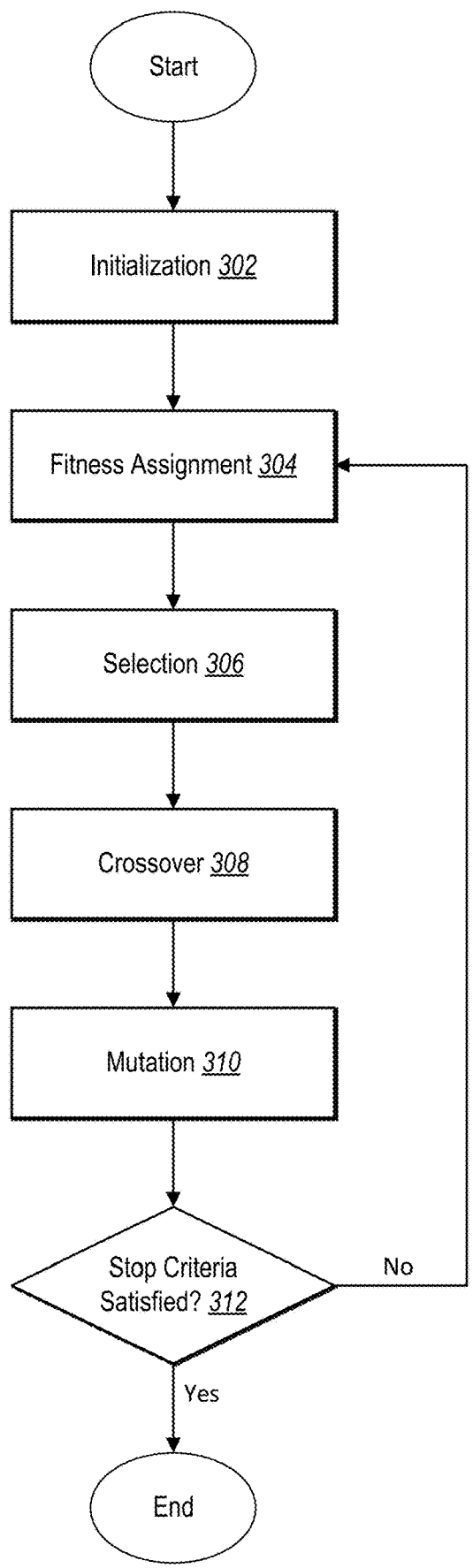
FIG. 3 illustrates an example genetic algorithm in accordance with one or more embodiments.

As mentioned, the genetic communication distribution system 102 utilizes a genetic algorithm (e.g., the genetic algorithm 218) to, based on a target objective (as indicated by the administrator device 114), generate a set of distribution schedules and select a target distribution schedule for distributing electronic communications. FIG. 3 illustrates a series of acts, processes, or methods in applying the genetic algorithm 218 in accordance with one or more embodiments. For example, the genetic communication distribution system 102 implements, as part of the genetic algorithm 218, an initialization 302, a fitness assignment 304, a selection 306, a crossover 308, and a mutation 310, and a determination 312 of whether stop criteria are satisfied. Although FIG. 3 illustrates a particular number and order of acts in the genetic algorithm, in some embodiments the genetic algorithm contains additional or fewer acts and/or includes acts in a different order or sequence. For example, in some embodiments, the genetic communication distribution system 102 performs a mutation before performing a crossover.

As illustrated in FIG. 3, the genetic communication distribution system 102 performs an initialization 302 of the genetic algorithm 218. In particular, the genetic communication distribution system 102 applies one of the objective functions to generate a set of initial candidate distribution schedules. For example, the genetic communication distribution system 102 utilizes one of the rate maximization objective functions, an open rate decay objective function, or a threshold interaction probability objective function. In some embodiments, the genetic communication distribution system 102 utilizes an objective function by implementing a greedy algorithm. The genetic communication distribution system 102 can also perform the initialization 302 by randomly generating distribution schedules and identifying those schedules that are feasible for implementation. Additional detail regarding the greedy algorithm and the objective functions is provided below with reference to FIG. 4.

As further illustrated in FIG. 3, the genetic communication distribution system 102 performs a fitness assignment 304. In particular, the genetic communication distribution system 102 evaluates the quality or fitness of candidate distribution schedules based on applying the one or more objective functions. For example, the genetic communication distribution system 102 applies a fitness function (i.e., an objective function together with various filtering parameters) to assess the quality of individual candidate distribution schedules. In some embodiments, the genetic communication distribution system 102 generates fitness scores (e.g., reflecting the degree to which candidate schedules satisfy a particular objective) and ranks the candidate distribution schedules based on the fitness scores.

In addition, the genetic communication distribution system 102 performs a selection 306. For example, the genetic communication distribution system 102 selects candidate distribution schedules based on fitness scores. Indeed, as just discussed, the genetic communication distribution system 102 generates fitness scores by applying an objective function to determine respective probabilities of eliciting user responses associated with individual candidate distribution schedules. In some embodiments, the genetic communication distribution system 102 selects candidate distribution schedules based on a fitness ranking by, for example, selecting a number (e.g., one, two, five, or ten) of top-ranked candidate distribution schedules (e.g., as ranked based on fitness scores). Similarly, the genetic communication distribution system 102 can select those candidate distribution schedules whose fitness scores satisfy a fitness score threshold. Additional detail regarding the fitness assignment 304 and the selection 306 is provided below with reference to FIG. 5.

As shown, the genetic communication distribution system 102 performs a crossover 308 as part of a genetic algorithm (e.g., the genetic algorithm 218). In particular, the genetic communication distribution system 102 combines two or more candidate distribution schedules to generate a crossover distribution schedule. In some embodiments, the genetic communication distribution system 102 randomly selects, from a first candidate distribution schedule, a subset of distribution times to combine with a second candidate distribution schedule to create a crossover distribution schedule. In the same or other embodiments, the genetic communication distribution system 102 adds the crossover distribution schedule to the set of candidate distribution schedules for subsequent iterations of the crossover 308 and/or the genetic algorithm 218. Additional detail regarding the crossover 308 is provided below with reference to FIG. 6.

Additionally, as shown in FIG. 3, the genetic communication distribution system 102 performs a mutation 310 as part of a genetic algorithm (e.g., the genetic algorithm 218). In particular, the genetic communication distribution system 102 modifies a portion of a candidate distribution schedule to generate a mutation distribution schedule. For example, the genetic communication distribution system 102 selects one or more distribution times from a candidate distribution schedule and implements or applies a complement operation with respect to the selected distribution times to generate a mutation distribution schedule. In some embodiments, the genetic communication distribution system 102 further adds the mutation distribution schedule to the set of distribution schedules for analysis on subsequent iterations of the mutation 310 and/or the genetic algorithm 218. Additional detail regarding the mutation 310 is provided below with reference to FIG. 7.

As shown, the genetic communication distribution system 102 repeats the acts, processes, or methods 304-312 of the genetic algorithm, adding some distribution schedules to a set of distribution schedules while removing others until one or more stop criteria are satisfied. As shown, the genetic communication distribution system 102 further performs a determination 312 of whether the stop criteria are satisfied. For example, the genetic communication distribution system 102 determines whether a threshold number of iterations (e.g., 10) of the genetic algorithm 218 have been performed without substantial improvement (e.g., improvement above a particular threshold or percentage). Additionally (or alternatively), the genetic communication distribution system 102 determines whether an overall threshold number of iterations (e.g., 500) of the genetic algorithm 218 have been performed in total. Upon determining that the stopping criteria are met, the genetic communication distribution system 102 ends the genetic algorithm 218 and refrains from additional iterations of the acts 304-312. Upon determining that the stopping criteria are not met, however, the genetic communication distribution system 102 continues to perform the methods 304-312 of the genetic algorithm 218 until the stopping criteria are satisfied.

Figure 4:
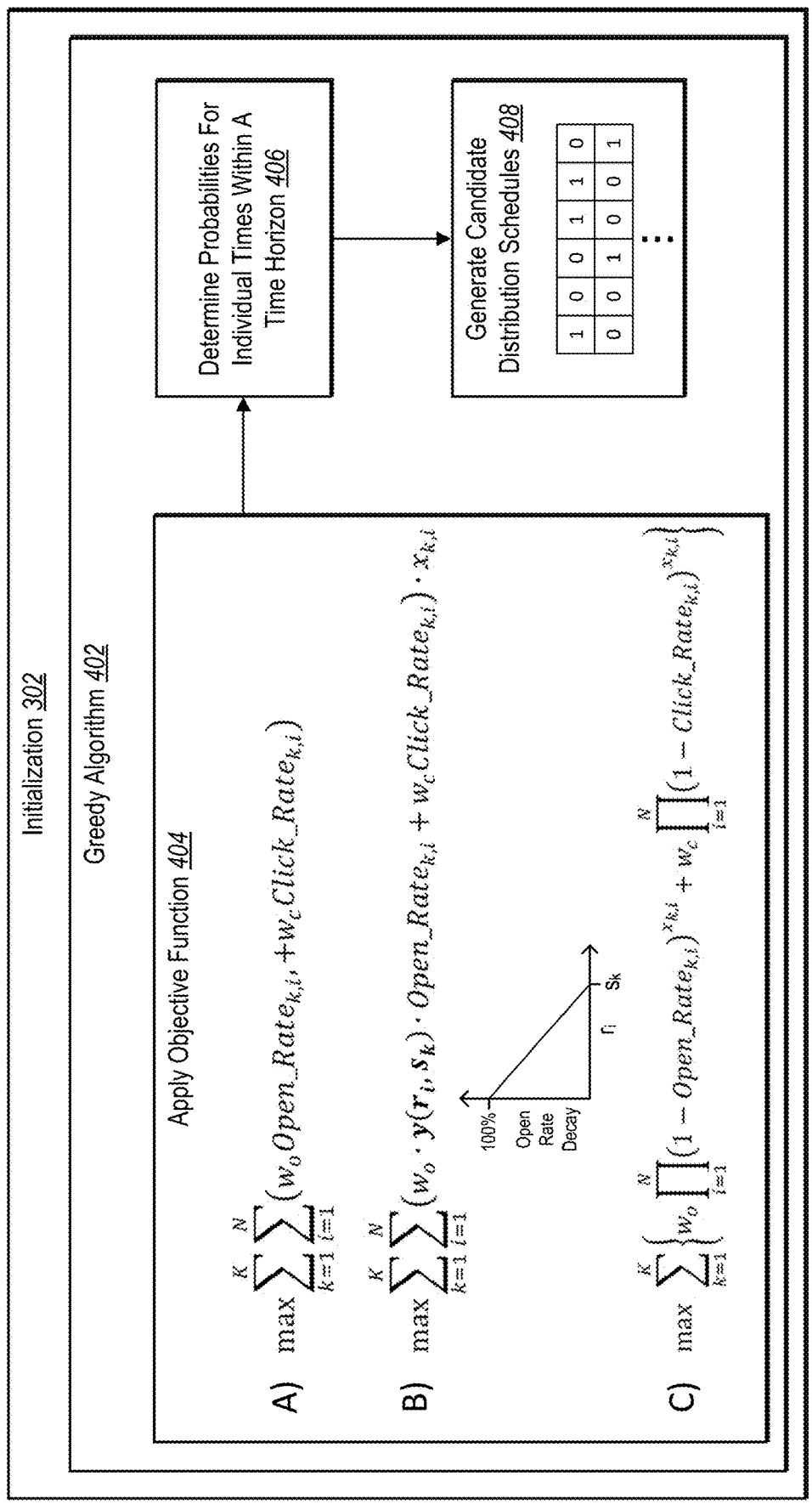
FIG. 4 illustrates initialization of a genetic algorithm in accordance with one or more embodiments.

As mentioned, the genetic communication distribution system 102 performs an initialization (e.g., the initialization 302) as part of implementing a genetic algorithm (e.g., the genetic algorithm 218). Indeed, FIG. 4 illustrates an example initialization 302 that the genetic communication distribution system 102 applies as part of the genetic algorithm 218. As shown, the genetic communication distribution system 102 performs an act 404 to apply an objective function.

More specifically, the genetic communication distribution system 102 applies an objective function reflecting a target objective as indicated by the administrator device 114. For example, the genetic communication distribution system 102 utilizes one or more of the objective functions A, B, and C shown in FIG. 4. In some embodiments, the genetic communication distribution system 102 utilizes a rate maximization objective function (objective function A in FIG. 4) to improve (e.g., maximize) a click rate and/or an open rate for a user over a target time horizon. To elaborate, the genetic communication distribution system 102 implements the rate maximization objective function given by:

$$\max \sum_{k=1}^{K} \sum_{i=1}^{N} (w_o \text{Open\_Rate}_{k,i} + w_c \text{Click\_Rate}_{k,i}) \cdot x_{k,i}$$

in accordance with the constraints of $$\sum_{i=1}^{N} f_k x_{k,i} \leq T$$

$$\sum_{i=1}^{N} x_{k,i} \leq E$$

where i is the distribution time index (e.g., a day index), k is the recipient/client device index, N is the number of individual distribution times (e.g., days) in the target time horizon, K is the total number of recipients/client devices, $x_{k,i}$ is the binary decision variable $\in \{0,1\}$ (e.g., to send or not to send at distribution time i for the $k^{th}$ recipient/client device), $\text{Open\_Rate}_{k,i}$ is the predicted open rate at distribution time i for the $k^{th}$ recipient/client device (e.g., the predicted open rate 212), $\text{Click\_Rate}_{k,i}$ is the predicted click rate at distribution time i for the $k^{th}$ recipient/client device (e.g., the predicted click rate 214), $w_o$ is the weighting factor for the open rate, and $w_c$ is the weighting factor for the click rate.

In addition, with reference to the above constraints, $f_k$ is the fatigue probability for each delivery of an electronic communication for the $k^{th}$ recipient/client device, T is the total fatigue tolerance/threshold, and E is the total delivery or distribution number limit of electronic communications per recipient/client device. Thus, based on the first of the two above constraints, the genetic communication distribution system 102 limits the fatigue probability of a particular user/recipient to no more than a total fatigue tolerance/threshold (as received from the administrator device 114). In addition, based on the second constraint above, the genetic communication distribution system 102 limits the total number of electronic communications distributed for a given recipient/client device to no more than a maximum number of distributed electronic communications (as received from the administrator device 114).

In these or other embodiments, the genetic communication distribution system 102 utilizes an open rate decay optimization function (objective function B in FIG. 4). In particular, the open rate decay optimization function describes the phenomenon where recipient users may be temporarily tired of opening new electronic communications (e.g., when there are too many electronic communications in a short period of time). Indeed, in some embodiments, the genetic communication distribution system 102 determines an acceptable/threshold distribution frequency for each individual user/client device. Thus, if the distribution frequency for a given user is above a threshold distribution frequency for the user, it is likely that the user's open rate will reduce. Accordingly, the genetic communication distribution system 102 incorporates an open rate decay or an open rate discount function, as given by:

$$\gamma(r_i, s_k) = \begin{cases} \frac{1}{S_k}(s_k - r_i) & \text{if } r_i \le s_k \\ 1 & \text{otherwise} \end{cases}$$

where $r_i$ is the last individual distribution time from the distribution time index (e.g., day) i, or a distribution recency, such that:

$$r_i = \text{argmax}_{j \in [1, i-1]}(j | X_{k,i-1}, x_j = 1)$$

$$X_{k,i-1} = \{x_{k,1}, x_{k,2}, \ldots, x_{k,i-1}\}$$

where $X_{k,i-1}$ is the past decision sequence (to send or not to send electronic communications) from distribution time (e.g., day) 1 to distribution time i−1, and $s_k$ is the threshold distribution frequency for the user/client device k.

As illustrated in FIG. 4, the genetic communication distribution system 102 incorporates, as part of the open rate decay objective function, an open rate decay or an open rate discount function. As shown by the graph under objective function B in FIG. 4, the genetic communication distribution system 102 utilizes an open rate decay function in the form of:

$$y(r_i, s_k).$$

Based on the open rate decay function, the genetic communication distribution system 102 modifies the rate maximization objective function to incorporate the open rate decay. Thus, the genetic communication distribution system 102 generates an open rate decay objective function, as given by:

$$\max \sum_{k=1}^{K} \sum_{i=1}^{N} (w_o y(r_i, s_k) \text{Open\_Rate}_{k,i} + w_c \text{Click\_Rate}_{k,i}) \cdot x_{k,i}$$

in accordance with the constraints of $$\sum_{i=1}^{N} f_k x_{k,i} \le T$$

$$\sum_{i=1}^{N} x_{k,i} \le E$$

where the variables are as described above in relation to the rate maximization objective function.

In some embodiments, the genetic communication distribution system 102 only applies the open rate decay to the open rate term of the objective function, with the assumption that the probability of a user clicking on an electronic communication is unaffected by the decay phenomenon. In other embodiments, however, the genetic communication distribution system 102 applies the open rate decay to the open rate term and a click rate decay to the click rate term.

In the same or other embodiments, the genetic communication distribution system 102 utilizes a threshold interaction probability objective function (objective function C in FIG. 4) to generate candidate distribution schedules. More particularly, the genetic communication distribution system 102 improves (e.g., maximizes) a probability that a user will click and/or open at least a threshold number (e.g., one, five, or ten) electronic communications over a target time horizon. Indeed, for a plurality of recipient users/client devices, and given a sequence of open/click probabilities $p_1$, $p_2, \ldots, p_n$ the genetic communication distribution system 102 determines a threshold interaction probability of, for example, at least one interaction, as given by:

$$p_{\ge 1} = 1 - (1-p_1)(1-p_2) \ldots (1-p_n) = 1 - \Pi(1-p_i).$$

To represent the threshold interaction probability objective function on the portfolio level, the genetic communication distribution system 102 utilizes the threshold interaction probability objective function given by:

$$\max \sum_{k=1}^{K} \left\{ w_o \sum_{i=1}^{N} (1 - \text{Open\_Rate}_{k,i})^{x_{k,i}} + w_c \sum_{i=1}^{N} (1 - \text{Click\_Rate}_{k,i})^{x_{k,i}} \right\}$$

in accordance with the constraints of $$\sum_{i=1}^{N} f_k x_{k,i} \le T$$

$$\sum_{i=1}^{N} x_{k,i} \le E$$

where the variables are as described above in relation to the rate maximization objective function.

As illustrated in FIG. 4, the genetic communication distribution system 102 performs the act 404 to apply one or more of the objective functions A, B, or C. In some embodiments, the genetic communication distribution system 102 performs the act 404 (in addition to the acts 406 and 408) as part of a greedy algorithm 402. To elaborate, the genetic communication distribution system 102 implements a greedy algorithm to generate an initial set of candidate distribution schedules.

For example, the genetic communication distribution system 102 applies a greedy algorithm to apply an objective function to determine individual distribution times that improve (e.g., maximize) probabilities or scores for eliciting a user response. As shown below, the genetic communication distribution system 102 utilizes various inputs for the genetic algorithm, such as a predicted open rate 212, a predicted click rate 214, an open rate weight, a click rate weight, a maximum number of distributed electronic communications, a fatigue per distributed electronic communication, and a total fatigue tolerance. The genetic communication distribution system 102 utilizes the greedy algorithm to generate scores for individual distribution times across a target time horizon. Based on the scores for individual distribution times across a target time horizon obtained via an objective function, the genetic communication distribution system 102 applies a greedy algorithm to select particular distribution times for distributing electronic communications. Indeed, the genetic communication distribution system 102 selects those distribution times that maximize the probability of a response (i.e., that have the highest scores).

Indeed, in some embodiments the genetic communication distribution system 102 utilizes a greedy algorithm represented by the following pseudo-code:

---
Greedy Algorithm for Electronic Communication Distribution
---
```
INPUT:  open_rates // open rates indexed by distribution times (e.g., daily open rates)
        click_rates // click rates indexed by distribution times (e.g., daily click rates)
        w_o // open rate weight
        w_c // click rate weight
        N // maximum number of electronic communications to distribute
        f // fatigue per distributed electronic communication
        T // total fatigue tolerance
MAKE_SCHEDULE (INPUT)
        n = 0 // number of distributed electronic communications
        delivery_days = { } // planned delivery/distribution days (or other distribution times)
        tf = 0 // total fatigue rate
        score(i) = w_o * open_rates(i) + w_c * click_rates(i) // apply objective function (A, B, or C)
        WHILE n < N and tf <= T-f:
            di = argmax(score) // find the distribution time index with the highest score
            score(i) = -1 // label the i^th distribution time as selected
            delivery_days += {di}
            tf += f
            n = n + 1
            RETURN delivery_days
```
---

As shown in the above pseudo-code, and as illustrated in FIG. 4, the genetic communication distribution system 102 performs an act 406 to determine probabilities for individual distribution times within a target time horizon based on applying the objective function. The genetic communication distribution system 102 further determines a distribution time with a highest probability from among a plurality of potential distribution times. Thus, based on the selected distribution times, the genetic communication distribution system 102 performs an act 408 to generate a set of candidate distribution schedules. Indeed, the candidate distribution schedules include a vector of binary variables corresponding to individual distribution times. For example, the genetic communication distribution system 102 generates a first candidate distribution schedule of [1,0,0,1,1,0] and a second candidate distribution schedule [0,0,1,0,0,1] (in addition to others), where each binary variable ("0" or "1") represents a determination to either distribute or refrain from distributing an electronic communication at the corresponding distribution time. Thus, the genetic communication distribution system 102 generates an initial population of candidate distribution schedules that may include outputs from a greedy algorithm.

In addition to utilizing a greedy algorithm, the genetic communication distribution system 102 can also identify candidate distribution schedules utilizing other approaches. For example, in some embodiments, the genetic communication distribution system 102 also generates candidate distribution schedules by randomly generating distribution schedules. For example, the genetic communication distribution system 102 can generate a plurality of distribution schedules by randomly determining distribution times for providing digital content. The genetic communication distribution system 102 can identify feasible distribution schedules from the generated distribution schedules and utilize these feasible distribution schedules as candidate distribution schedules. In addition, in some embodiments, the genetic communication distribution system 102 can utilize candidate distribution schedules that define a specified number (e.g., one) of distributed electronic communications.

Figure 5:
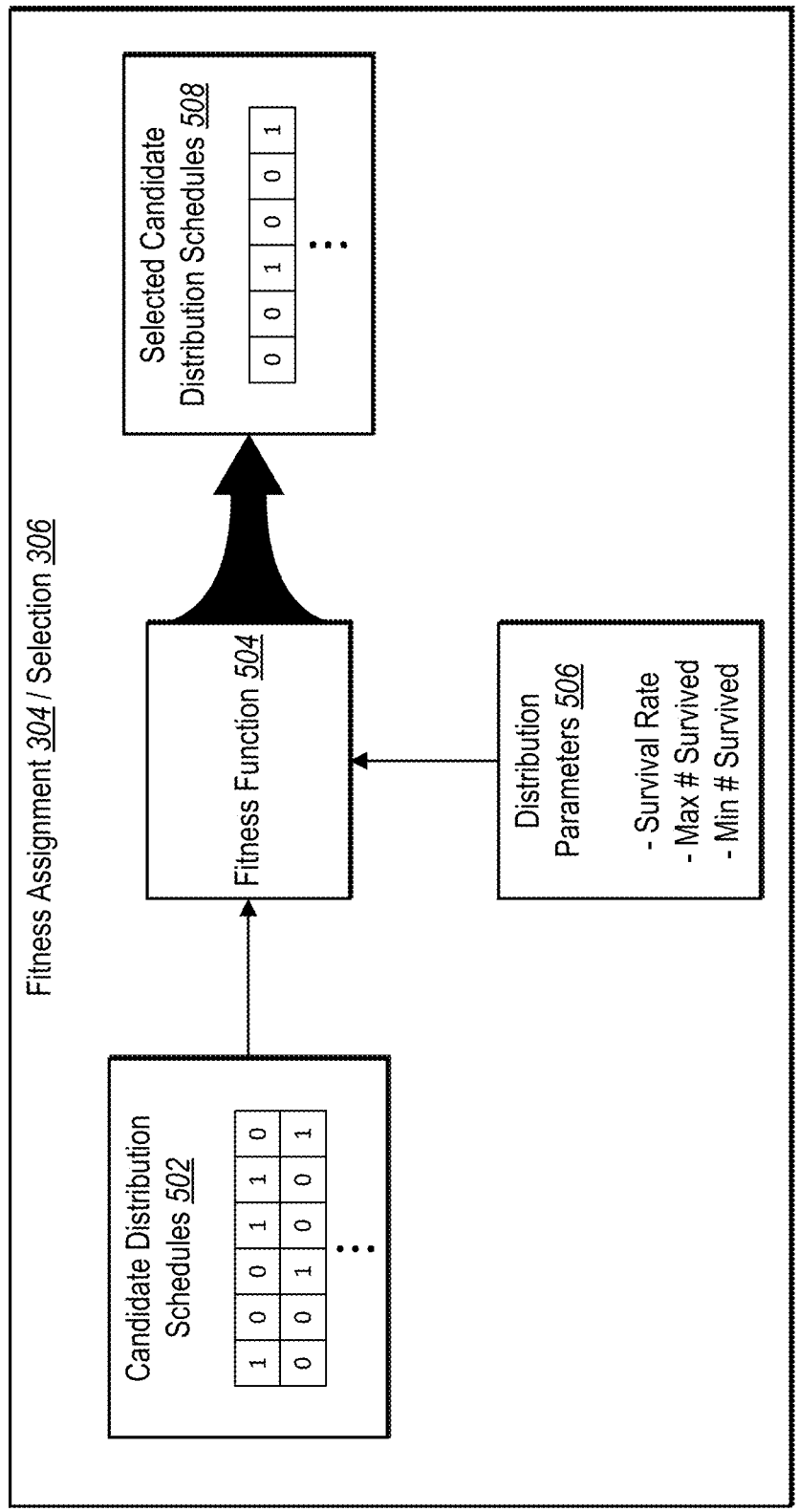
FIG. 5 illustrates assignment and selection of distribution schedules in accordance with one or more embodiments.

As mentioned, the genetic communication distribution system 102 performs a fitness assignment and selection of distribution schedules as part of utilizing a genetic algorithm. For example, FIG. 5 illustrates example components involved in the fitness assignment 304 and selection 306 as part of the genetic algorithm 218. As described, the genetic communication distribution system 102 generates a set of candidate distribution schedules 502 (e.g., via the initialization 302 of FIG. 4 for a first iteration of the genetic algorithm and from an output of a previous iteration for subsequent iterations). In addition, the genetic communication distribution system 102 evaluates the quality or fitness of those candidate distribution schedules by applying a fitness function 504 (e.g., an objective function together with other parameters).

By applying the fitness function 504, the genetic communication distribution system 102 determines fitness scores for the candidate distribution schedules 502. In some embodiments, the genetic communication distribution system 102 determines fitness scores based on the scores output by the objective function. The genetic communication distribution system 102 also ranks the candidate distribution schedules 502 based on their respective fitness scores. In some embodiments, the genetic communication distribution system 102 applies the fitness function 504 to evaluate the candidate distribution schedules 502 and selects one or more distribution schedules from the candidate distribution schedules 502 based on distribution parameters 506.

For example, the genetic communication distribution system 102 selects candidate distribution schedules in accordance with distribution parameters such as a survival rate (a percentage of the candidate distribution schedules to select), a maximum number of survived candidate distribution schedules, a minimum number of candidate distribution schedules, and/or a selection distribution. In some embodiments, the genetic communication distribution system 102 applies distribution parameters of a 30% survival rate, a maximum number of survived candidate distribution schedules of 200, a minimum number of survived candidate distribution schedules of 10, and a selection distribution of rejection sampling in accordance with fitness rankings of the candidate distribution schedules.

Based on applying the fitness function 504 in accordance with the distribution parameters 506, the genetic communication distribution system 102 generates a set of selected candidate distribution schedules 508 which includes a subset of the candidate distribution schedules 502. Indeed, the genetic communication distribution system 102 performs a selection 306 in conjunction with applying the fitness function 504 as part of the fitness assignment 304. For instance, the genetic communication distribution system 102 selects, from the candidate distribution schedules 502 and based on applying the fitness function 504 in accordance with the distribution parameters 506, candidate distribute distribution schedules that satisfy the distribution parameters 506 to include within the selected candidate distribution schedules 508. In some embodiments, the genetic communication distribution system 102 selects candidate distribution schedules based on fitness scores by, for example, selecting candidate distribution schedules whose scores satisfy a fitness score threshold. In accordance with a survival rate, the genetic communication distribution system 102 selects candidate distribution schedules based on fitness rankings of the respective candidate distribution schedules by, for example, selecting a top number (e.g., one, two, five, or ten) candidate distribution schedules. Accordingly, in some embodiments the genetic communication distribution system 102 drops or discards one or more of the candidate distribution schedules 502 that have lower fitness rankings, comparing with the top n candidate distribution schedules.

Figure 6:
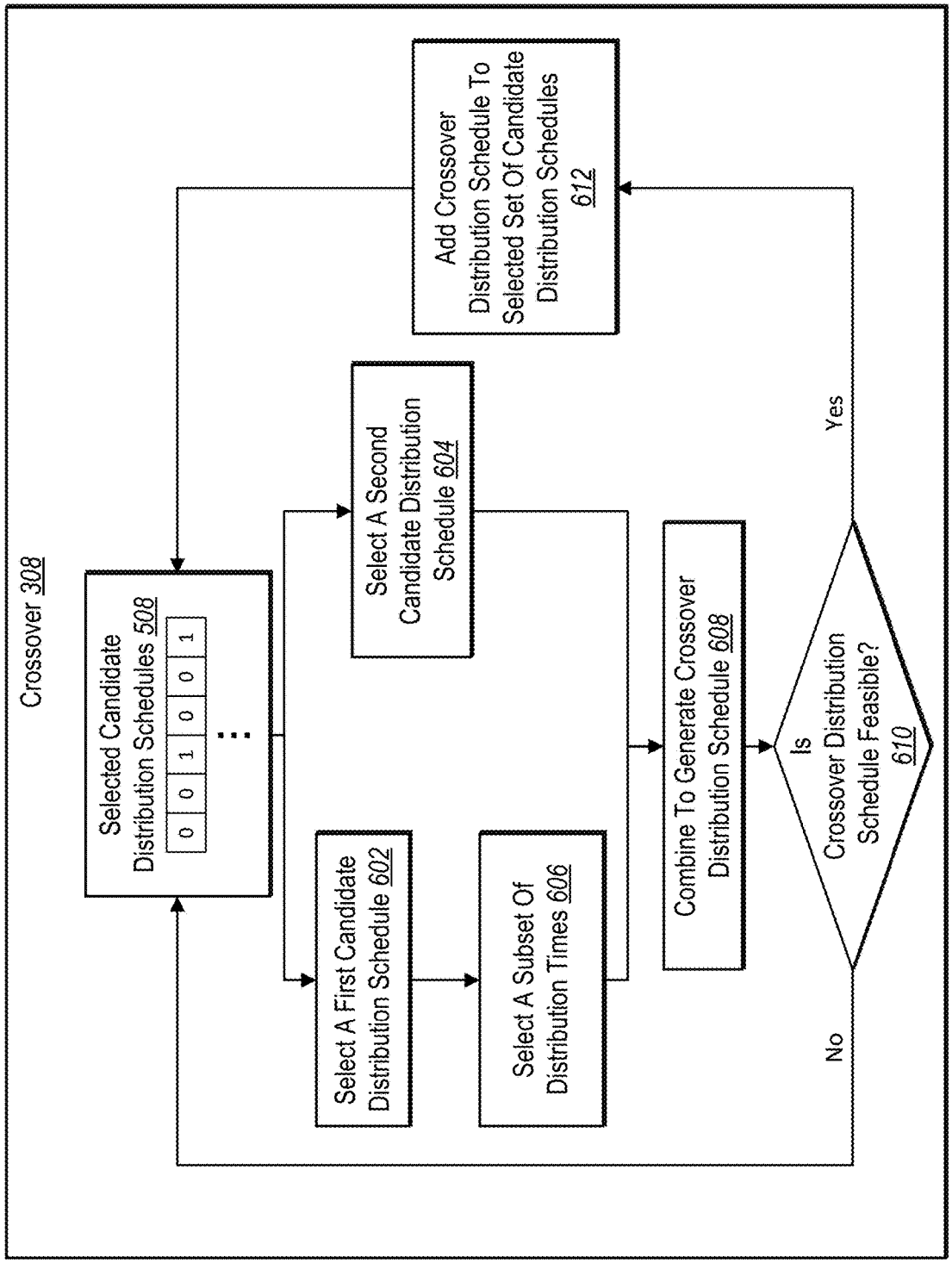
FIG. 6 illustrates generating crossover distribution schedules in accordance with one or more embodiments.

As mentioned, the genetic communication distribution system 102 further performs a crossover as part of a genetic algorithm. Indeed, FIG. 6 illustrates the crossover 308 that the genetic communication distribution system 102 performs as part of the genetic algorithm 218. As illustrated in FIG. 6, the genetic communication distribution system 102 performs a number of acts 602-612 with respect to candidate distribution schedules within the set of selected candidate distribution schedules 508.

As shown, the genetic communication distribution system 102 performs an act 602 to select a first candidate distribution schedule from the set of selected candidate distribution schedules 508. The genetic communication distribution system 102 further performs an act 604 to select a second candidate distribution schedule from the set of selected candidate distribution schedules 508. For example, the genetic communication distribution system 102 randomly selects a first candidate distribution schedule and a second candidate distribution schedule according to a probability distribution (e.g., as indicated by the administrator device 114).

In addition, the genetic communication distribution system 102 performs an act 606 to select a subset of distribution times from the first candidate distribution schedule. In particular, the genetic communication distribution system 102 selects one or more individual distribution times from the first candidate distribution schedule. For example, the genetic communication distribution system 102 selects individual hours, days, or other distribution times, depending on the indexing of the objective functions described above. The genetic communication distribution system 102 additionally performs an act 608 to combine the selected subset of distribution times from the first candidate distribution schedule with the second candidate distribution schedule. For example, the genetic communication distribution system 102 fills selected distribution times from the first candidate distribution schedule with distribution times from the second candidate distribution schedule. Thus, by combining the subset of distribution times with the second candidate distribution schedule, the genetic communication distribution system 102 generates a crossover distribution schedule.

Further, the genetic communication distribution system 102 performs an act 610 to determine whether the crossover distribution schedule is feasible. For example, the genetic communication distribution system 102 determines feasibility based on constraints such as a target time horizon, a maximum number of distributed electronic communications, a minimum number of distribution electronic communications, a fatigue tolerance, and/or exclusion dates (or other distribution times). If the crossover distribution schedule is feasible, the genetic communication distribution system 102 performs an act 612 to add the crossover distribution schedule to the set of selected candidate distribution schedules 508. Thus, the genetic communication distribution system 102 modifies the set of candidate distribution schedules 508 to include one or more crossover distribution schedules for subsequent iterations of the crossover 308 and/or the genetic algorithm 218. On the other hand, if the genetic communication distribution system 102 determines that the crossover distribution schedule is not feasible, then the genetic communication distribution system 102 refrains from adding the crossover distribution schedule to the set of selected candidate distribution schedules 508.

Although FIG. 6 illustrates selecting two candidate distribution schedules, in some embodiments the genetic communication distribution system 102 selects and combines more than two candidate distribution schedules. In these or other embodiments, the genetic communication distribution system 102 selects individual distribution times from more than one individual candidate distribution schedule. For example, the genetic communication distribution system 102 selects a first subset of distribution times from a first selected candidate distribution schedule, a second subset from a second candidate distribution schedule, and combines the first and second subsets of distribution times with a third candidate distribution schedule to generate a crossover distribution schedule. Additional or alternative combinations are also possible for more or fewer selected candidate distribution schedules.

Figure 7:
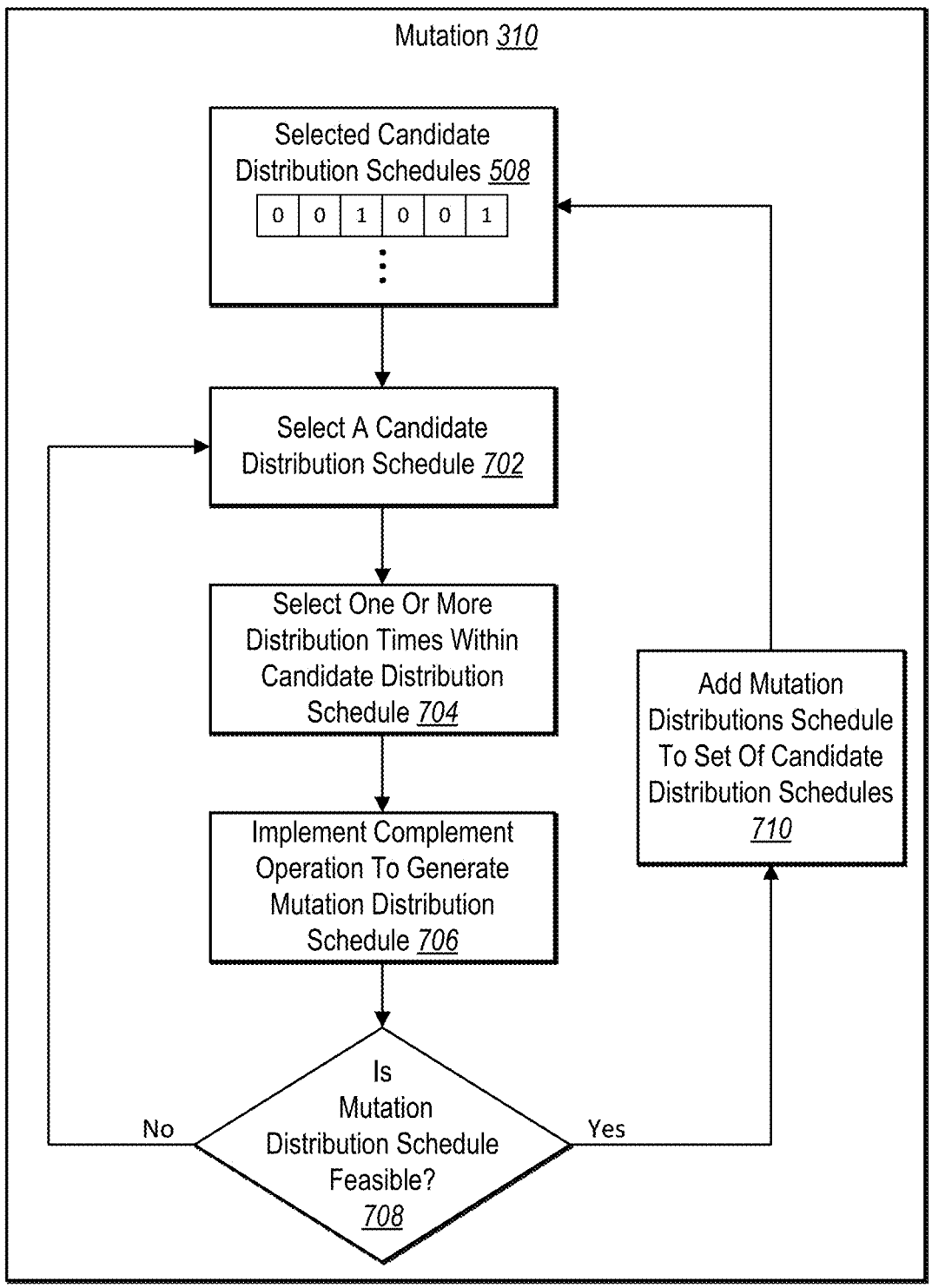
FIG. 7 illustrates generating mutation distribution schedules in accordance with one or more embodiments.

As further mentioned, the genetic communication distribution system 102 performs a mutation as part of applying a genetic algorithm the generate a target distribution schedule. Indeed, FIG. 7 illustrates an example mutation 310 that the genetic communication distribution system 102 performs as part of utilizing the genetic algorithm 218. In particular, the genetic communication distribution system 102 performs a series of acts 702-710 as part of the mutation 310 to, for example, randomly modify a portion or subset of distribution times within one or more candidate distribution schedules.

As illustrated in FIG. 7, the genetic communication distribution system 102 performs an act 702 to select a candidate distribution schedule. For example, the genetic communication distribution system 102 randomly selects a candidate distribution schedule according to a probability distribution (e.g., as indicated by the administrator device 114). The genetic communication distribution system 102 further performs an act 704 to select one or more distribution times within the selected candidate distribution schedule. In some embodiments, the genetic communication distribution system 102 selects a single distribution time, while in other embodiments the genetic communication distribution system 102 selects two or more distribution times within the candidate distribution schedule. Based on the selected individual distribution time(s), the genetic communication distribution system 102 performs an act 706 to implement or perform a complement operation on the selected distribution time(s). For example, the genetic communication distribution system 102 performs a complement operation by reversing the selections of one or more distribution times. In some embodiments, the genetic communication distribution system 102 selects a single distribution time and implements the complement operation with respect to the single distribution time. Thus, the genetic communication distribution system 102 generates a mutation distribution schedule by modifying a candidate distribution schedule utilizing a complement operation with respect to selected distribution time(s).

As shown, the genetic communication distribution system 102 further performs an act 708 to determine whether the mutation distribution schedule is feasible. For example, in some embodiments, the genetic communication distribution system 102 determines feasibility based on constraints such as a target time horizon, a maximum number of distributed electronic communications, a minimum number of distribution electronic communications, a fatigue tolerance, and/or exclusion dates (or other distribution times). If the mutation distribution schedule is feasible, then the genetic communication distribution system 102 performs an act 710 to add the mutation distribution schedule to the set of candidate distribution schedules 508. Thus, the genetic communication distribution system 102 modifies the set of candidate distribution schedules 508 to include one or more mutation distribution schedules for subsequent iterations of the mutation 310 and/or the genetic algorithm 218. On the other hand, if the genetic communication distribution system 102 determines that the mutation distribution schedule is not feasible, then the genetic communication distribution system 102 refrains from adding the mutation distribution schedule to the set of selected candidate distribution schedules 508.

Figure 8:
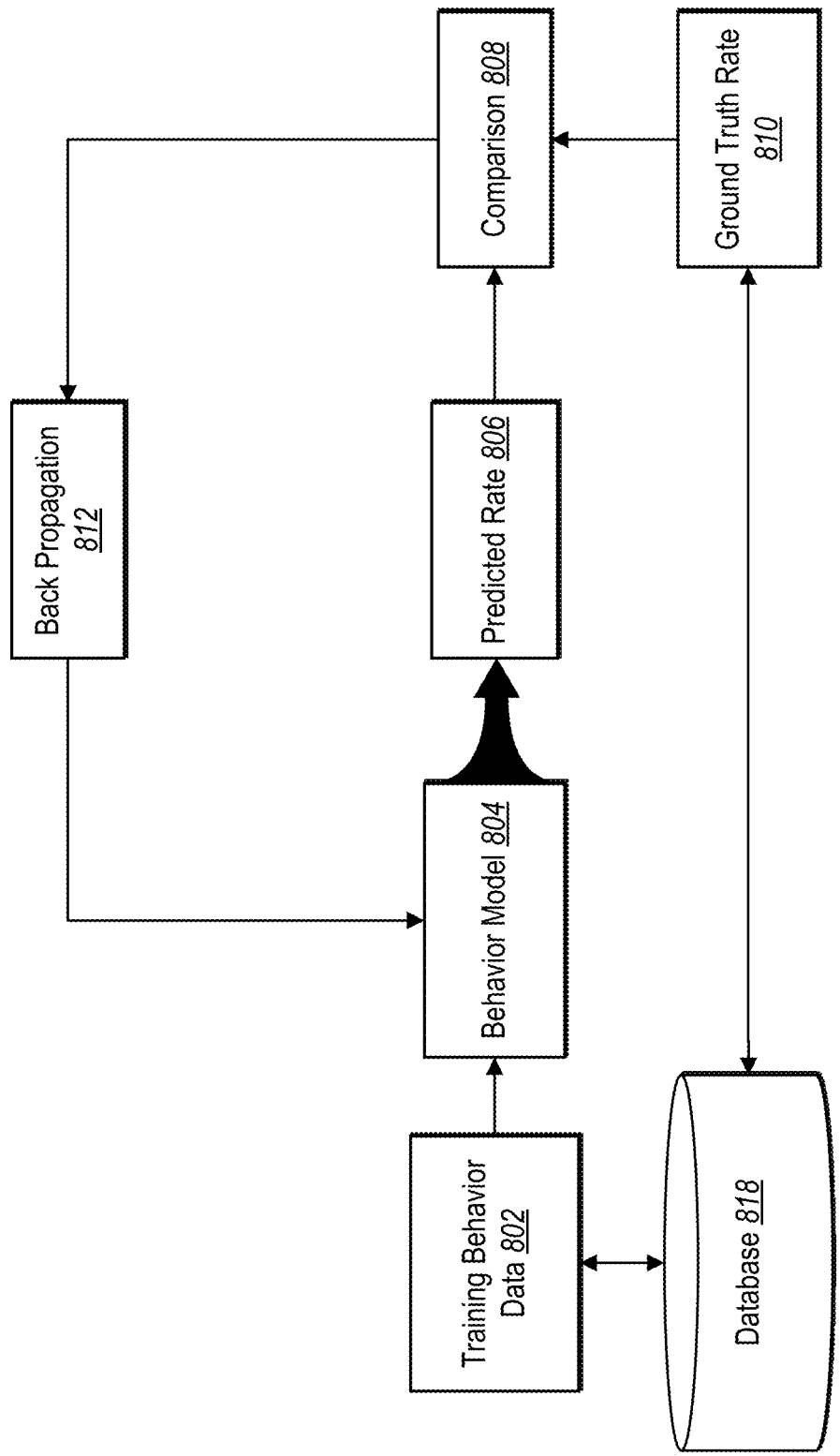
FIG. 8 illustrates training a behavior prediction model in accordance with one or more embodiments.

As mentioned above, the genetic communication distribution system 102 can utilize one or more trained behavior models to generate behavioral predictions for individual users. For example, the genetic communication distribution system 102 can train an open behavior model 202, a click behavior model 204, and/or a fatigue behavior model 206 to generate predictions of open rates, click rates, and fatigue rates, respectively. FIG. 8 illustrates training a behavior model 804 (e.g., the open behavior model 202, the click behavior model 204, or the fatigue behavior model 206) in accordance with one or more embodiments.

As illustrated in FIG. 8, the genetic communication distribution system 102 accesses a database 818 that stores user-specific training data such as training behavior data 802 (e.g., historical user behavior data and/or training user/client device identification) and ground truth rates such as ground truth open rates, click rates, and fatigue rates. The genetic communication distribution system 102 accesses the training behavior data 802 from the database 818 to provide as input to the training behavior data 802 to the behavior model 804. Based on the input training behavior data 802, the behavior model 804 generates a predicted rate 806 (e.g., a predicted open rate, a predicted click rate, or a predicted fatigue rate, depending on the type of behavior model 804).

Further, the genetic communication distribution system 102 performs a comparison 808 to compare the predicted rate 806 with a ground truth rate 810. Indeed, the genetic communication distribution system 102 accesses the ground truth rate 810 from the database 818 (e.g., the actual observed rate corresponding to a particular user), where the ground truth rate 810 corresponds to the training behavior data 802. To implement the comparison 808, the genetic communication distribution system 102 utilizes a loss function to determine an error or measure of loss associated with the behavior model 804. For example, the genetic communication distribution system 102 utilizes a cross entropy loss function (i.e., logistic loss), an area under receiver operating characteristic (AUC of ROC) curve loss function, an average AUC of ROC loss function for an individual user, a precision function, a recall function, or some other loss function to determine a measure of loss between the predicted rate 806 and the ground truth rate 810.

Based on the comparison 808, the genetic communication distribution system 102 further performs a back propagation 812. In particular, the genetic communication distribution system 102 can back propagate by modifying one or more weights associated with the behavior model 804. Indeed, the genetic communication distribution system 102 modifies weights to improve the accuracy of the behavior model 804 by reducing the error or measure of loss. Thus, the genetic communication distribution system 102 utilizes the behavior model 804 to generate subsequent rate predictions based on additional training data after modifying the weights of the behavior model 804. Accordingly, as the genetic communication distribution system 102 repeats the process illustrated in FIG. 8, the genetic communication distribution system 102 increases the accuracy of the behavior model 804 (e.g., until the error or measure of loss is below a threshold and/or for a threshold number of iterations).

As mentioned above, the genetic communication distribution system 102 can improve accuracy relative to conventional digital communication distribution systems. Indeed, FIG. 9 illustrates improvements observed by experimenters from applying the genetic communication distribution system 102 relative to a conventional batch-distribution system. Specifically, experimenters ran a test for a three-week target time horizon in an email campaign that included 99,362 recipients, where the maximum delivery number over the target time horizon was set to 5.

As shown in FIG. 9, the genetic communication distribution system 102 showed significant improvement relative to conventional systems. Specifically, the results of the test revealed an increase of 16% for total distributed electronic communications ("Total Sent"), a 50% increase in the total number of opens, an 80% increase in the total number of clicks, a 19% decrease in the total fatigue, a 30% increase in the average open rate per delivery by utilizing the genetic communication distribution system.

Figure 10:
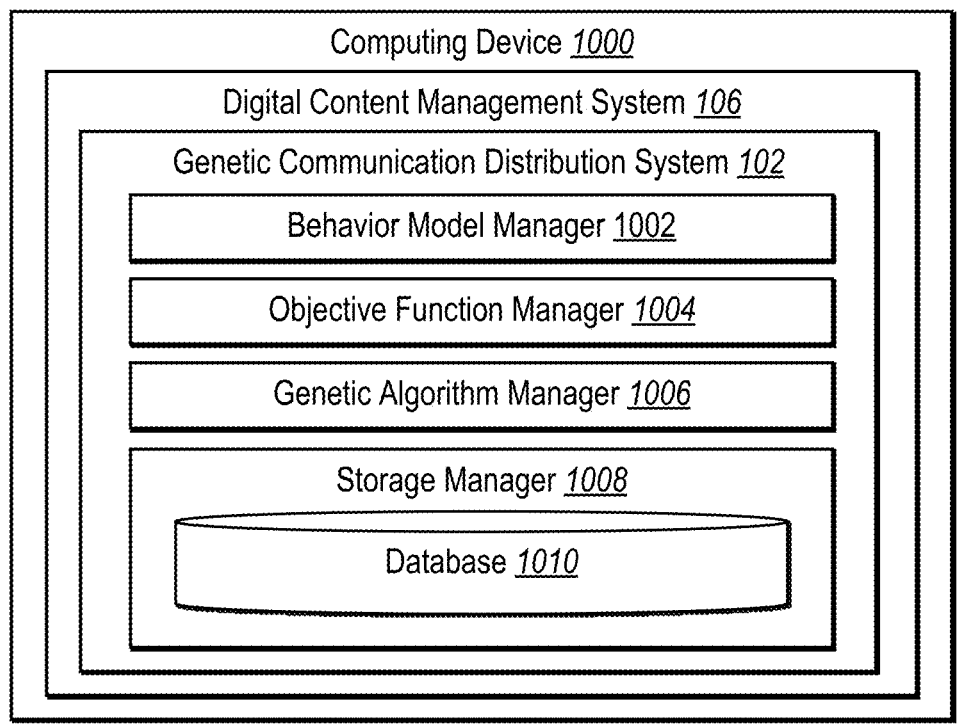
FIG. 10 illustrates a schematic diagram of a genetic communication distribution system in accordance with one or more embodiments.

Looking now to FIG. 10, additional detail will be provided regarding components and capabilities of the genetic communication distribution system 102. Specifically, FIG. 10 illustrates an example schematic diagram of the genetic communication distribution system 102 on an example computing device 1000 (e.g., one or more of the client devices 108a-108n, the administrator device 114, and/or the server(s) 104). As shown in FIG. 10, the genetic communication distribution system 102 may include a behavior model manager 1002, an objective function manager 1004, a genetic algorithm manager 1006, and a storage manager 1008.

As just mentioned, the genetic communication distribution system 102 includes a behavior model manager 1002. In particular, the behavior model manager 1002 manages, maintains, trains, utilizes, applies, and/or implements one or more behavior models. For example, the behavior model manager 1002 manages an open behavior model (e.g., the open behavior model 202), a click behavior model (e.g., the click behavior model 204), and a fatigue behavior model (e.g., the fatigue behavior model 206). For example, the behavior model manager 1002 trains the behavior models to generate accurate rate predictions based on training data. In addition, the behavior model manager 1002 applies the behavior models to generate rate predictions based on historical user behavior data. Indeed, the behavior model manager 1002 communicates with the storage manager 1008 to access training data and/or historical user behavior data from the database 1010 (e.g., the database 208 and/or the database 818). The behavior model manager 1002 further communicates with the objective function manager 1004 and the genetic algorithm manager 1006 to generate a target distribution schedule based on the rate predictions.

As illustrated, the genetic communication distribution system 102 further includes an objective function manager 1004. In particular, the objective function manager 1004 manages, maintains, determines, utilizes, generates, or applies one or more objective functions with respect to predicted rates such as predicted open rates, predicted click rates, and/or predicted fatigue rates. For example, the objective function manager 1004 utilizes one or more of a rate maximization objective function, an open rate decay objective function, or a threshold interaction probability objective function to generate one or more candidate distribution schedules. In addition the objective function manager 1004 communicates with the genetic algorithm manager 1006 to generate a target distribution schedule based on the distribution schedules generated utilizing the objective function(s).

As mentioned, the genetic communication distribution system 102 includes a genetic algorithm manager 1006. In particular, the genetic algorithm manager 1006 manages, maintain, utilizes, applies, or implements a genetic algorithm to generate or determine one or more candidate distribution schedules and to select a target distribution schedule from the candidate distribution schedules. For example, the genetic algorithm manager 1006 performs one or more acts, methods, processes, or techniques as part of the genetic algorithm, including an initialization (e.g., the initialization 302), a fitness assignment (e.g., the fitness assignment 304), a selection (e.g., the selection 306), a crossover (e.g., the crossover 308), a mutation (e.g., the mutation 310), and a determination of whether one or more stop criteria are satisfied (e.g., the determination 312), as described herein.

In one or more embodiments, each of the components of the genetic communication distribution system 102 are in communication with one another using any suitable communication technologies. Additionally, the components of the genetic communication distribution system 102 can be in communication with one or more other devices including one or more client devices described above. It will be recognized that although the components of the genetic communication distribution system 102 are shown to be separate in FIG. 10, any of the subcomponents may be combined into fewer components, such as into a single component, or divided into more components as may serve a particular implementation. Furthermore, although the components of FIG. 10 are described in connection with the genetic communication distribution system 102, at least some of the components for performing operations in conjunction with the genetic communication distribution system 102 described herein may be implemented on other devices within the environment.

The components of the genetic communication distribution system 102 can include software, hardware, or both. For example, the components of the genetic communication distribution system 102 can include one or more instructions stored on a computer-readable storage medium and executable by processors of one or more computing devices (e.g., the computing device 1000). When executed by the one or more processors, the computer-executable instructions of the genetic communication distribution system 102 can cause the computing device 1000 to perform the methods described herein. Alternatively, the components of the genetic communication distribution system 102 can comprise hardware, such as a special purpose processing device to perform a certain function or group of functions. Additionally or alternatively, the components of the genetic communication distribution system 102 can include a combination of computer-executable instructions and hardware.

Furthermore, the components of the genetic communication distribution system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the genetic communication distribution system 102 may be implemented as part of a stand-alone application on a personal computing device or a mobile device. Alternatively or additionally, the components of the genetic communication distribution system 102 may be implemented in any application that allows creation and delivery of marketing content to users, including, but not limited to, applications in ADOBE MARKETING CLOUD, such as ADOBE CAMPAIGN and ADOBE ANALYTICS. "ADOBE," "ADOBE CAMPAIGN," and "ADOBE ANALYTICS" are trademarks of Adobe Inc. in the United States and/or other countries.

FIGS. 1-10, the corresponding text, and the examples provide a number of different systems, methods, and non-transitory computer readable media for generating a target distribution schedule for distributing electronic communications to individual users/client devices. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
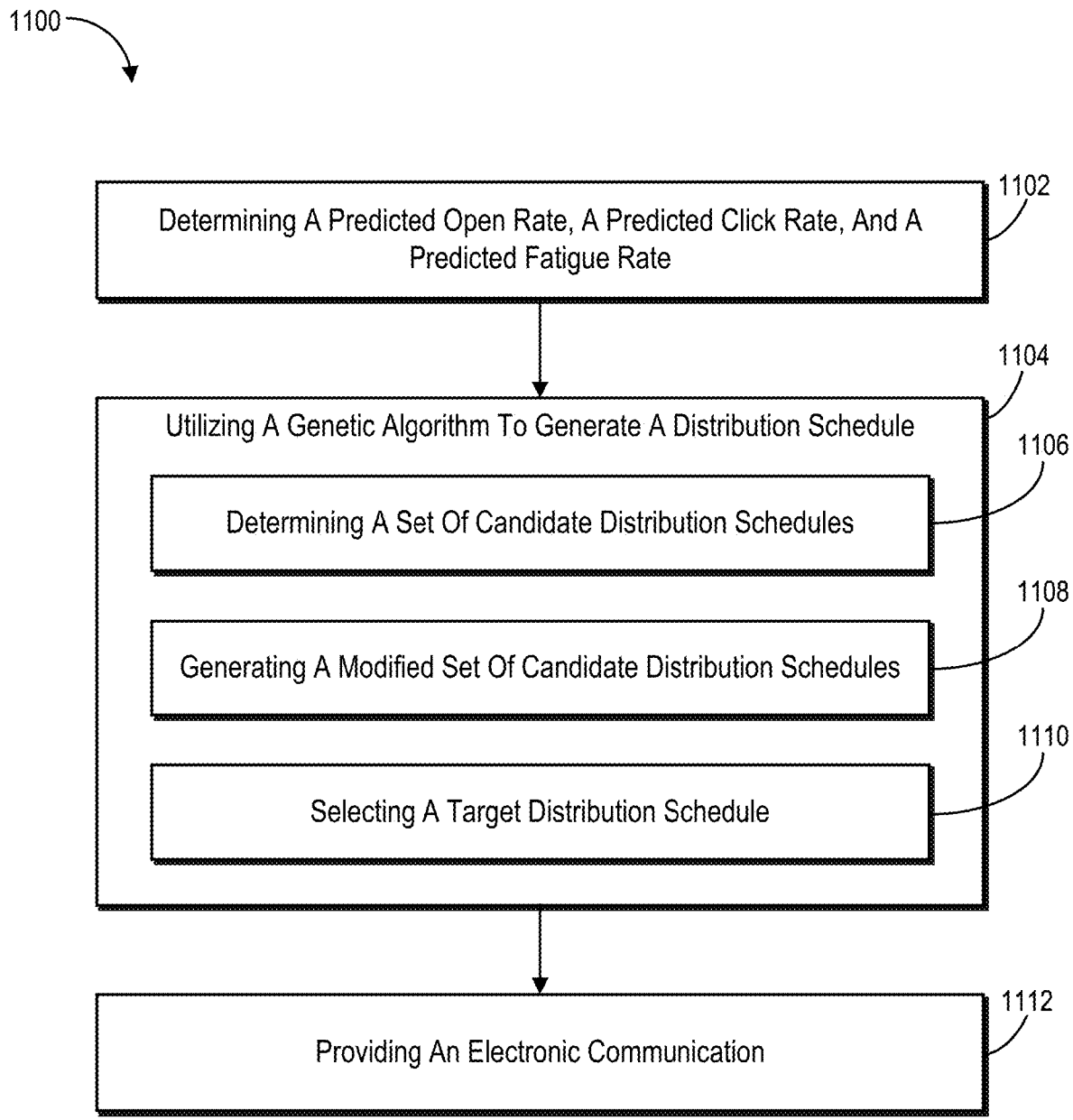
FIG. 11 illustrates a flowchart of a series of acts for providing electronic communications based on a target distribution schedule in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for providing an electronic communication based on a target distribution schedule. The series of acts 1100 includes an act 1102 of determining a predicted open rate, a predicted click rate, and a predicted fatigue rate. In particular, the act 1102 can involve determining, for a user over a target time horizon and based on previously distributed electronic communications, a predicted open rate, a predicted click rate, and a predicted fatigue rate. For example, the act 1102 can involve utilizing an open behavior model, a click behavior model, and a fatigue behavior model, wherein the open behavior model, the click behavior model, and the fatigue behavior model are each trained based on historical user behavior in relation to the previously distributed electronic communications.

As shown, the series of acts 1100 includes an act 1104 of utilizing a genetic algorithm to generate a distribution schedule. In particular, the act 1104 can include utilizing a genetic algorithm to generate, based on the predicted open rate, the predicted click rate, and the predicted fatigue rate, a distribution schedule for providing electronic communications. The distribution schedule can include a plurality of individual distribution times for providing the electronic communication and further comprises, for each of the plurality of individual distribution times, an indication of whether to provide the electronic communication.

The act 1104 can also include constituent acts including an act 1106 of determining a set of candidate distribution schedules. In particular, the act 1106 can involve determining, utilizing an objective function in relation to the predicted open rate, the predicted click rate, and the predicted fatigue rate, a set of candidate distribution schedules. The series of acts 1100 can further include an act of utilizing a fitness function to evaluate the objective function to select the set of candidate distribution schedules from among a plurality of candidate distribution schedules in accordance with one or more distribution parameters. The series of acts 1100 can also include an act of receiving an input from an administrator device to set the one or more distribution parameters. The objective function can include one of the rate maximization objective functions, an open rate decay objective function, or a threshold interaction probability objective function. In addition, the series of acts 1100 can include an act of receiving an input from an administrator device to select the objective function from among the rate maximization objective function, the open rate decay objective function, or the threshold interaction probability objective function.

Additionally, in some embodiments, the rate maximization objective function weights the predicted open rate and the predicted click rate to improve the weighted predicted open rate and the weighted predicted click rate over the target time horizon in accordance the predicted fatigue rate. In the same or other embodiments, the open rate decay objective function applies an open rate decay to the weighted predicted open rate of the rate maximization objective function. In these or other embodiments, the threshold interaction probability objective function increases a probability that the user will either open or click a distributed electronic communication a threshold number of times within the target time horizon.

The act 1104 can further include an act 1108 of generating a modified set of candidate distribution schedules. In particular, the act 1108 can include generating a modified set of candidate distribution schedules by adding at least one of a crossover distribution schedule or a mutation distribution schedule to the set of candidate distribution schedules. The act 1108 can involve generating a crossover distribution schedule by combining two candidate distribution schedules from the set of candidate distribution schedules. Generating a crossover distribution schedule can further involve randomly selecting a first candidate distribution schedule and a second candidate distribution schedule from among the set of candidate distribution schedules, selecting a subset of distribution times from the first candidate distribution schedule, and combining the subset of distribution times with the second candidate distribution schedule. In addition (or alternatively), the act 1108 can involve generating a mutation distribution schedule by modifying a candidate distribution schedule from the set of candidate distribution schedules. Generating a mutation distribution schedule can further involve randomly selecting a candidate distribution schedule from among the set of candidate distribution schedules and implementing a complement operation with respect to one or more individual distribution times within the candidate distribution schedule.

In addition, the act 1104 can include an act 1110 of selecting a target distribution schedule. In particular, the act 1110 can include selecting a target distribution schedule from the modified set of candidate distribution schedules based on the objective function. For example, the act 1110 can involve selecting the target distribution schedule by repeatedly applying the genetic algorithm to generate modified sets of candidate distribution schedules until one or more stop criteria are satisfied.

As illustrated, the series of acts 1100 can include an act 1112 of providing an electronic communication. In particular, the act 1112 can involve providing an electronic communication to the user based on the target distribution schedule.

The series of acts 1100 can further include an act of receiving input from an administrator device to set the target time horizon and an objective function utilized by the genetic algorithm. The series of acts 1100 can also (or additionally) include an act of utilizing a genetic algorithm to generate a distribution schedule for providing electronic communications to the user by iteratively: utilizing an objective function to determine a set of candidate distribution schedules based on a predicted open rate, a predicted click rate, and a predicted fatigue rate for a user over a target time horizon; generating a crossover distribution schedule by combining candidate distribution schedules from the set of candidate distribution schedules; generating a mutation distribution schedule by modifying a candidate distribution schedule from the set of candidate distribution schedules; and utilizing the objective function to determine a new set of candidate distribution schedules from the set of candidate distribution schedules, the crossover distribution schedule, and the mutation distribution schedule.

In one or more embodiments, the series of acts 1100 includes a step for generating a distribution schedule utilizing a genetic algorithm, the predicted open rate, the predicted click rate, and the predicted fatigue rate. For example, the acts and algorithms described above in relation to FIGS. 3-7 can provide the corresponding acts and algorithms (e.g., structure) for a step for generating a distribution schedule utilizing a genetic algorithm, a predicted open rate, a predicted click rate, and a predicted fatigue rate.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
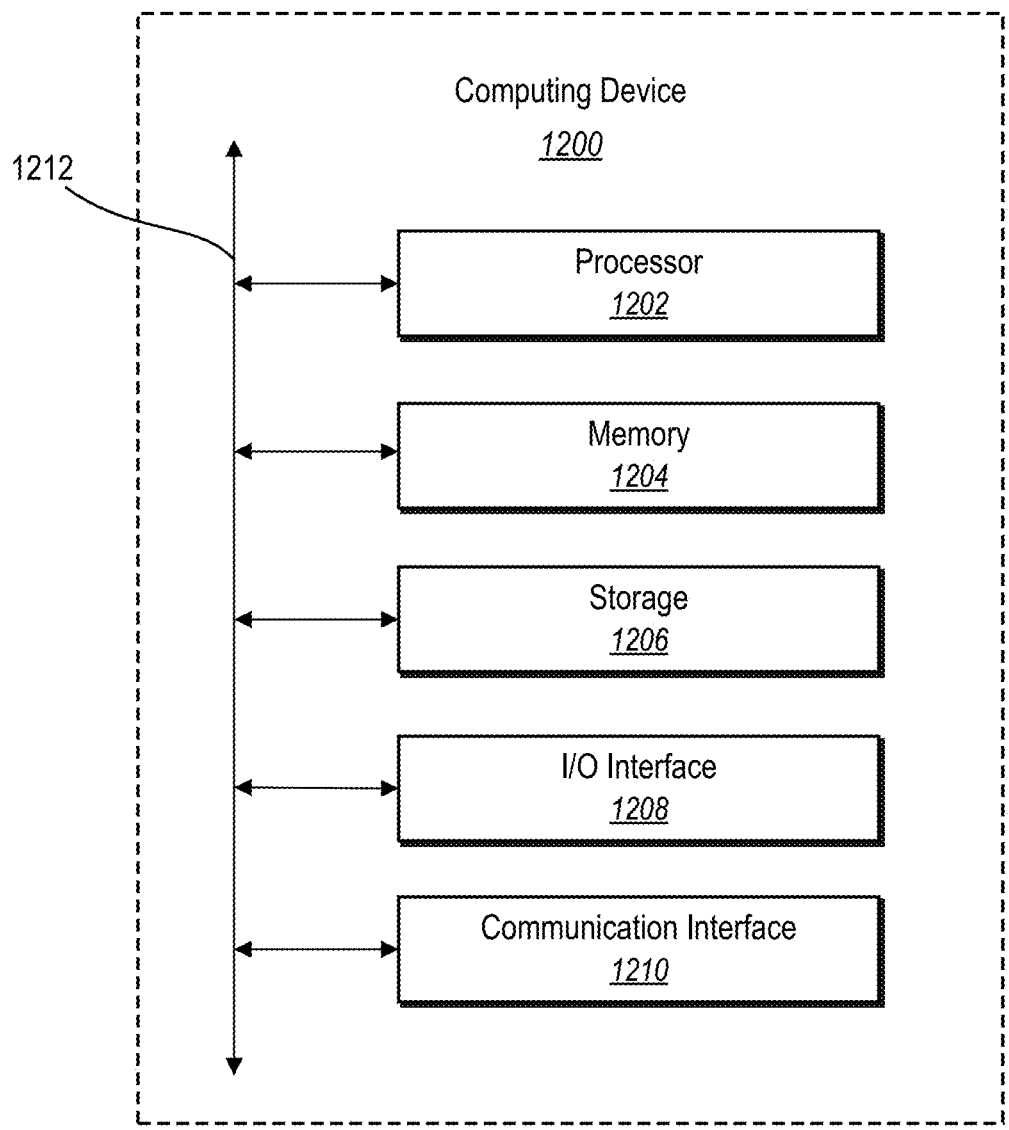
FIG. 12 illustrates a block diagram of an example computing device in accordance with one or more embodiments.

FIG. 12 illustrates, in block diagram form, an example computing device 1200 (e.g., the computing device 1000, the client devices 108a-108n, the administrator device 114, and/or the server(s) 104) that may be configured to perform one or more of the processes described above. One will appreciate that the genetic communication distribution system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for distributing electronic communications across computer networks, a computer-implemented method of determining electronic message send times for individual recipient devices, the computer-implemented method comprising:
   determining, by at least one processor for a user over a target time horizon and based on previously distributed electronic communications, a predicted open rate using an open behavior machine learning model trained to predict open rates, a predicted click rate using a click behavior machine learning model trained to predict click rates, and a predicted fatigue rate using a fatigue behavior machine learning model trained to predict fatigue rates;
   utilizing a genetic algorithm by the at least one processor to generate, based on the predicted open rate, the predicted click rate, and the predicted fatigue rate, a distribution schedule for providing electronic communications to the user by:
      determining, by the at least one processor utilizing an objective function in relation to the predicted open rate, the predicted click rate, and the predicted fatigue rate, a set of candidate distribution schedules;
      generating, by the at least one processor, a modified set of candidate distribution schedules by adding at least one of a crossover distribution schedule or a mutation distribution schedule to the set of candidate distribution schedules; and
      selecting, by the at least one processor, a target distribution schedule from the modified set of candidate distribution schedules based on the objective function; and
   providing an electronic communication for display within a user interface on a client device associated with the user based on the target distribution schedule.

2. The computer-implemented method of claim 1, further comprising receiving input from an administrator device to set the target time horizon and the objective function utilized by the genetic algorithm.

3. The computer-implemented method of claim 1, wherein the objective function utilized by the genetic algorithm comprises at least one of: a rate maximization objective function, an open rate decay objective function, or a threshold interaction probability objective function.

4. The computer-implemented method of claim 1, wherein the open behavior machine learning model, the click behavior machine learning model, and the fatigue behavior machine learning model are each trained based on historical user behavior in relation to the previously distributed electronic communications.

5. The computer-implemented method of claim 1, wherein the distribution schedule comprises a plurality of individual distribution times for providing the electronic communication and further comprises, for each of the plurality of individual distribution times, an indication of whether to provide the electronic communication.

6. A non-transitory computer readable medium comprising instructions that, when executed by at least one processor, cause a computer device to:
   determine, by the at least one processor for a user over a target time horizon and based on previously distributed electronic communications, a predicted open rate using an open behavior machine learning model trained to predict open rates, a predicted click rate using a click behavior machine learning model trained to predict click rates, and a predicted fatigue rate using a fatigue behavior machine learning model trained to predict fatigue rates;

utilize a genetic algorithm by the at least one processor to generate, based on the predicted open rate, the predicted click rate, and the predicted fatigue rate, a distribution schedule for providing electronic communications to the user by:

determining, by the at least one processor utilizing an objective function in relation to the predicted open rate, the predicted click rate, and the predicted fatigue rate, a set of candidate distribution schedules;

generating, by the at least one processor, a modified set of candidate distribution schedules by adding at least one of a crossover distribution schedule or a mutation distribution schedule to the set of candidate distribution schedules; and selecting, by the at least one processor, a target distribution schedule from the modified set of candidate distribution schedules based on the objective function; and provide an electronic communication for display within a user interface on a client device associated with the user based on the target distribution schedule.

7. The non-transitory computer readable medium of claim 6, further comprising instructions that, when executed by the at least one processor, cause the computer device to generate the crossover distribution schedule by combining two candidate distribution schedules from the set of candidate distribution schedules.

8. The non-transitory computer readable medium of claim 6, further comprising instructions that, when executed by the at least one processor, cause the computer device to generate the mutation distribution schedule by modifying a candidate distribution schedule from the set of candidate distribution schedules.

9. The non-transitory computer readable medium of claim 6, further comprising instructions that, when executed by the at least one processor, cause the computer device to utilize a fitness function comprising the objective function to select the set of candidate distribution schedules from among a plurality of candidate distribution schedules in accordance with one or more distribution parameters.

10. The non-transitory computer readable medium of claim 6, further comprising instructions that, when executed by the at least one processor, cause the computer device to select the target distribution schedule by repeatedly applying the genetic algorithm to generate modified sets of candidate distribution schedules until one or more stop criteria are satisfied.

11. The non-transitory computer readable medium of claim 6, wherein the objective function comprises one of a rate maximization objective function, an open rate decay objective function, or a threshold interaction probability objective function.

12. The non-transitory computer readable medium of claim 11, further comprising instructions that, when executed by the at least one processor, cause the computer device to receive an input from an administrator device to select the objective function from among the rate maximization objective function, the open rate decay objective function, or the threshold interaction probability objective function.

13. The non-transitory computer readable medium of claim 11, wherein:

the rate maximization objective function weights the predicted open rate and the predicted click rate to improve the weighted predicted open rate and the weighted predicted click rate over the target time horizon in accordance the predicted fatigue rate;

the open rate decay objective function applies an open rate decay to the weighted predicted open rate of the rate maximization objective function; and the threshold interaction probability objective function increases a probability that the user will either open or click a distributed electronic communication a threshold number of times within the target time horizon.

14. A system comprising:

a memory device comprising an open behavior machine learning model, a click behavior machine learning model, a fatigue behavior machine learning model, a genetic algorithm, and an objective function; and one or more processors coupled to the memory device, the one or more processors configured to:

determine, for a user over a target time horizon and based on previously distributed electronic communications, a predicted open rate using the open behavior machine learning model trained to predict open rates, a predicted click rate using the click behavior machine learning model trained to predict click rates, and a predicted fatigue rate using the fatigue behavior machine learning model trained to predict fatigue rates;

utilize the genetic algorithm to generate, based on the predicted open rate, the predicted click rate, and the predicted fatigue rate, a distribution schedule for providing electronic communications to the user by:

determining, utilizing the objective function in relation to the predicted open rate, the predicted click rate, and the predicted fatigue rate, a set of candidate distribution schedules;

generating a modified set of candidate distribution schedules by adding at least one of a crossover distribution schedule or a mutation distribution schedule to the set of candidate distribution schedules; and selecting a target distribution schedule from the modified set of candidate distribution schedules based on the objective function; and provide an electronic communication for display within a user interface on a client device associated with the user based on the target distribution schedule.

15. The system of claim 14, wherein the one or more processors are further configured to generate the crossover distribution schedule by combining two candidate distribution schedules from the set of candidate distribution schedules.

16. The system of claim 14, wherein the one or more processors are further configured to generate the mutation distribution schedule by modifying a candidate distribution schedule from the set of candidate distribution schedules.

17. The system of claim 14, wherein the one or more processors are further configured to utilize a fitness function comprising the objective function to select the set of candidate distribution schedules from among a plurality of candidate distribution schedules in accordance with one or more distribution parameters.

18. The system of claim 14, wherein the one or more processors are further configured to select the target distribution schedule by repeatedly applying the genetic algorithm to generate modified sets of candidate distribution schedules until one or more stop criteria are satisfied.

19. The system of claim 14, wherein the objective function comprises one of a rate maximization objective function, an open rate decay objective function, or a threshold interaction probability objective function.

20. The system of claim 19, wherein the one or more processors are further configured to receive an input from an administrator device to select the objective function from among the rate maximization objective function, the open rate decay objective function, or the threshold interaction probability objective function.

* * * * *